United States Patent [19]
Hird et al.

[11] Patent Number: 5,131,027
[45] Date of Patent: * Jul. 14, 1992

[54] SHORT TIME VALIDITY STORAGE

[75] Inventors: John A. Hird, Dallas; Lindsey D. Owen; Michael R. Rice, both of Carrollton, all of Tex.

[73] Assignee: Intellicall, Inc., Carrollton, Tex.

[*] Notice: The portion of the term of this patent subsequent to Jun. 12, 2007 has been disclaimed.

[21] Appl. No.: 536,204

[22] Filed: Jun. 11, 1990

Related U.S. Application Data

[63] Continuation of Ser. No. 301,028, Jan. 23, 1989, Pat. No. 4,933,965.

[51] Int. Cl.⁵ ............................................. H04M 17/02
[52] U.S. Cl. .................................... 379/112; 379/130; 379/132; 379/144
[58] Field of Search ............... 379/130, 112, 114, 152, 379/144, 155

[56] References Cited

U.S. PATENT DOCUMENTS 4,439,636  3/1984  Newkirk et al. .................... 379/144

Primary Examiner—Stafford D. Schreyer
Attorney, Agent, or Firm—Baker & Botts

[57] ABSTRACT

A telephone system and method of operation are disclosed which use a microprocessor control system (10), a speech generator (34) and speech memory (46) to interact with a calling party placing a long distance phone call. The telephone receives a billing account number from the calling party through a keypad (24). The telephone determines the validity of the billing account number and, if the billing account number is valid, a communication path is established through a telephone line interface (38). Valid billing account numbers are stored in the telephone for a predetermined period of time. The stored numbers are polled prior to the validation process to determine if an entered number has already been validated. In this manner, a calling party making multiple calls with the same billing account number need only wait for his account number to be verified once.

4 Claims, 22 Drawing Sheets

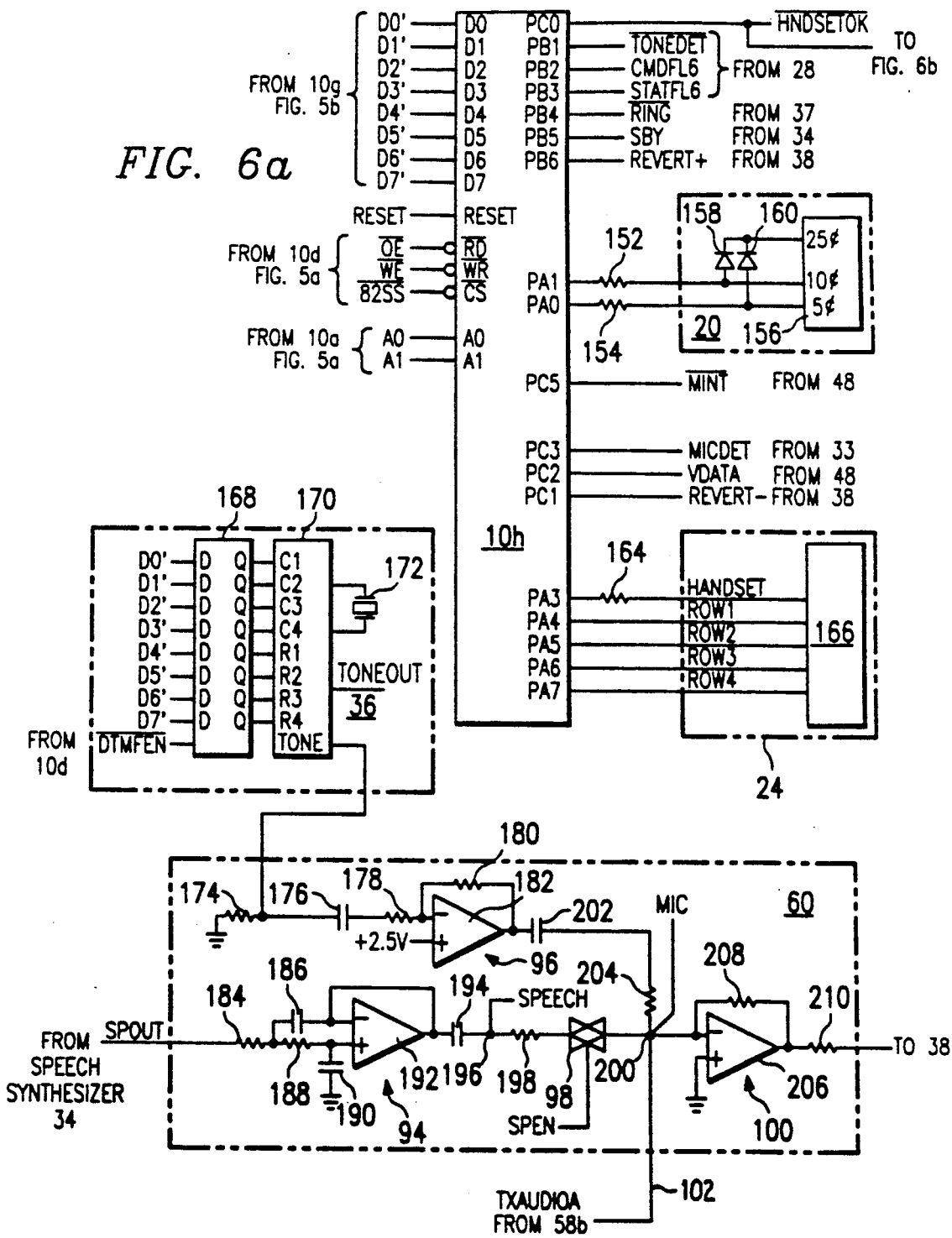

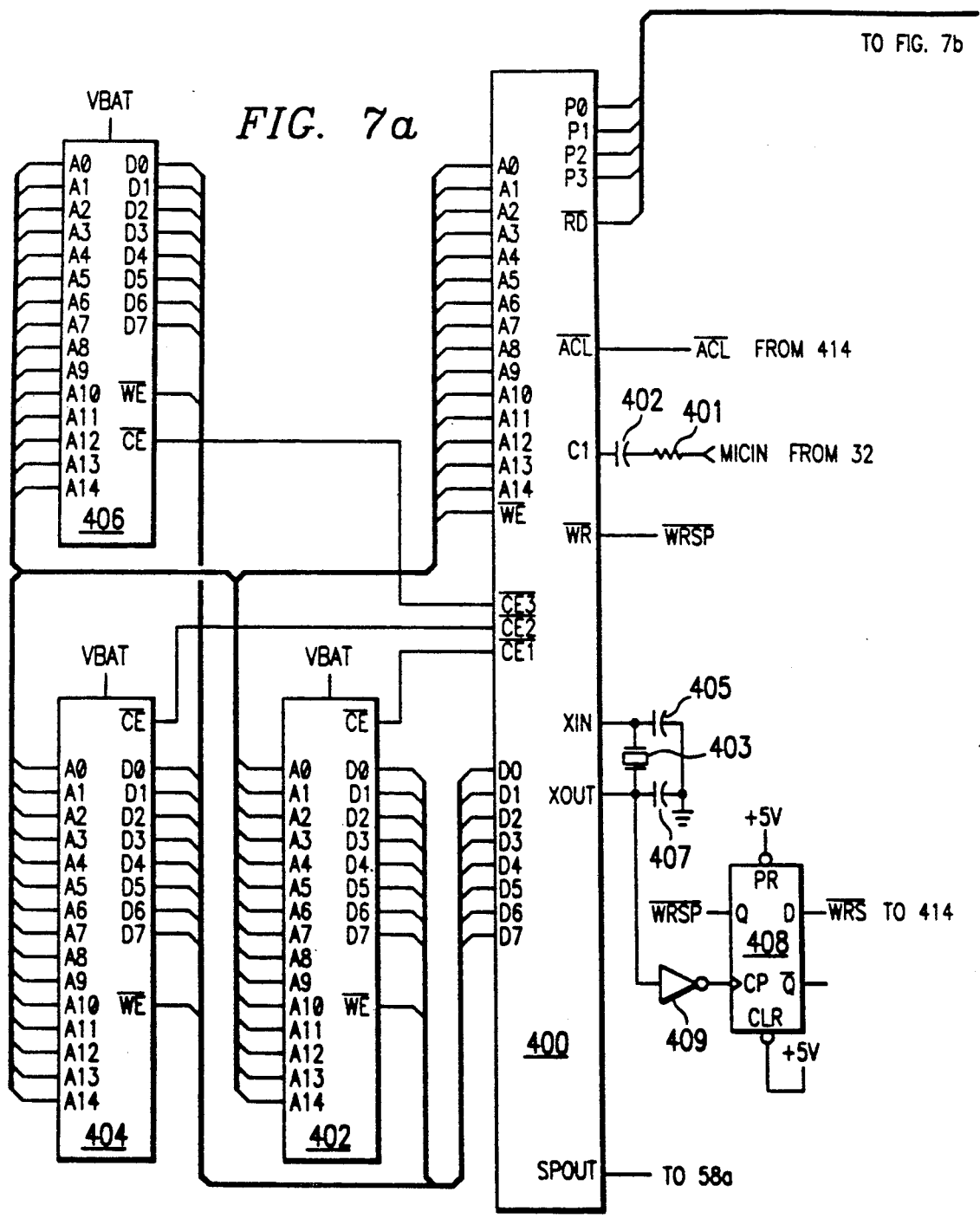

– 1 –

SHORT TIME VALIDITY STORAGE

RELATED APPLICATIONS

This is a continuation application of application Ser. No. 07/301,028, filed on Jan. 23, 1989, by John A. Hird, Lindsey D. Owen and Michael R. Rice for SHORT TIME VALIDITY STORAGE OF A BILLING ACCOUNT NUMBER AT A LOCAL TELECOMMUNICATIONS STATION, now U.S. Pat. No. 4,933,965, issued Jun. 12, 1990.

TECHNICAL FIELD OF THE INVENTION

This invention relates in general to the field of telecommunications systems. Specifically, the present invention relates to a method and apparatus which enhances the functionality of a local telecommunications station in the placing of calls using telephone billing account numbers.

BACKGROUND OF THE INVENTION

The private ownership of pay telephone technology has been an added source of revenue for a variety of businesses for some time. The actual cash collection from the coins deposited by users of pay telephone stations is an important aspect of such revenues. More recently, due to technological advances and changes in the business climate, businesses have been able to add income from long distance telephone calls. With the use of an Automated Operator Service (AOS), a private owner of a telephone can bill users of the telephone for both inter-LATA and intra-LATA long distance calls.

While AOS systems can generate revenue where none existed before, they are very inefficient. An AOS usually operates from a central office. Hence, in the case of an intra-LATA call, the call may have to travel hundreds of miles and finally terminate a few miles from its origination point. The unnecessary miles traveled through the network are expensive and this cost is usually borne by the user, through higher long distance rates, or by the owner of the telephone through lower commissions.

In addition, private owners of pay telephones have heretofore lost a considerable amount of revenue because of the inability to charge for calls placed using telephone billing account numbers such as telephone credit cards. Although such phone calls have been made on the privately owned and maintained pay telephone, the primary telephone companies have reaped the benefit of placing the calls using billing account numbers.

Therefore, a need has arisen for a telecommunications system which can automate and simplify the processes currently handled by a traditional AOS. Specifically, a need has arisen for a pay telephone station which can automatically route long distance calls without the intervention of an outside service, and which allows the pay telephone owner to charge revenues for the completion of a credit card call and calls using other forms of billing account numbers.

In order for a local pay telephone owner to bill for these calls, the local pay telephone station must have the ability to determine the validity of a billing account number entered by a user. This verification process necessarily slows the time required to process a call. A pay telephone station which could store a billing account number which has already been verified could substantially reduce the time required to process later calls placed by the same party. Therefore, a further need has arisen for a pay telephone station which is capable of storing billing account numbers which have been verified and is capable of accessing the stored information in order to reduce call processing time.

SUMMARY OF THE INVENTION

In accordance with the present invention, a telecommunications device is provided which performs functions similar to the telephone company or an AOS, but does so locally and automatically. More specifically, a device is provided which is interactive with the calling party and the called party through the use of prompting messages. These messages can supply information or prompting to the users of the device and can thereby automatically complete calls that would otherwise require the services of a live operator. By using these messages, the device can locally complete calls for a calling party using a telephone credit card number or other billing account number.

In accordance with one aspect of the invention, a telecommunications device is provided which can receive a telephone billing account number from a calling party. The telecommunications device can then determine if the billing account number is valid. If the billing account number is determined to be valid, the telecommunications device places the call and stores the validated billing account number for a predetermined period of time.

An important technical advantage of the present system is its ability to locally store validated billing account numbers for a predetermined period of time. This local storage of valid billing account numbers greatly reduces the call processing time necessary for telephone calls placed by the same calling party on the same telephone.

BRIEF DESCRIPTION OF THE DRAWINGS

A more complete understanding of the present invention may be derived by referring to the detailed description and claims when considered in connection with the accompanying drawings, in which like reference numbers indicate like features through the drawings, and wherein:

DETAILED DESCRIPTION OF THE INVENTION

A more complete understanding of the present invention may be derived by referring to the following detailed description when considered in connection with the accompanying FIGS. 1 through 12. Like reference numbers indicate like features throughout the drawings. In addition, reference designations for branch points in the flowcharts and for signals contained in the schematic diagrams indicate connections which could not otherwise be adequately demonstrated due to space constraints.

Block Diagram of the System

Figure 1:
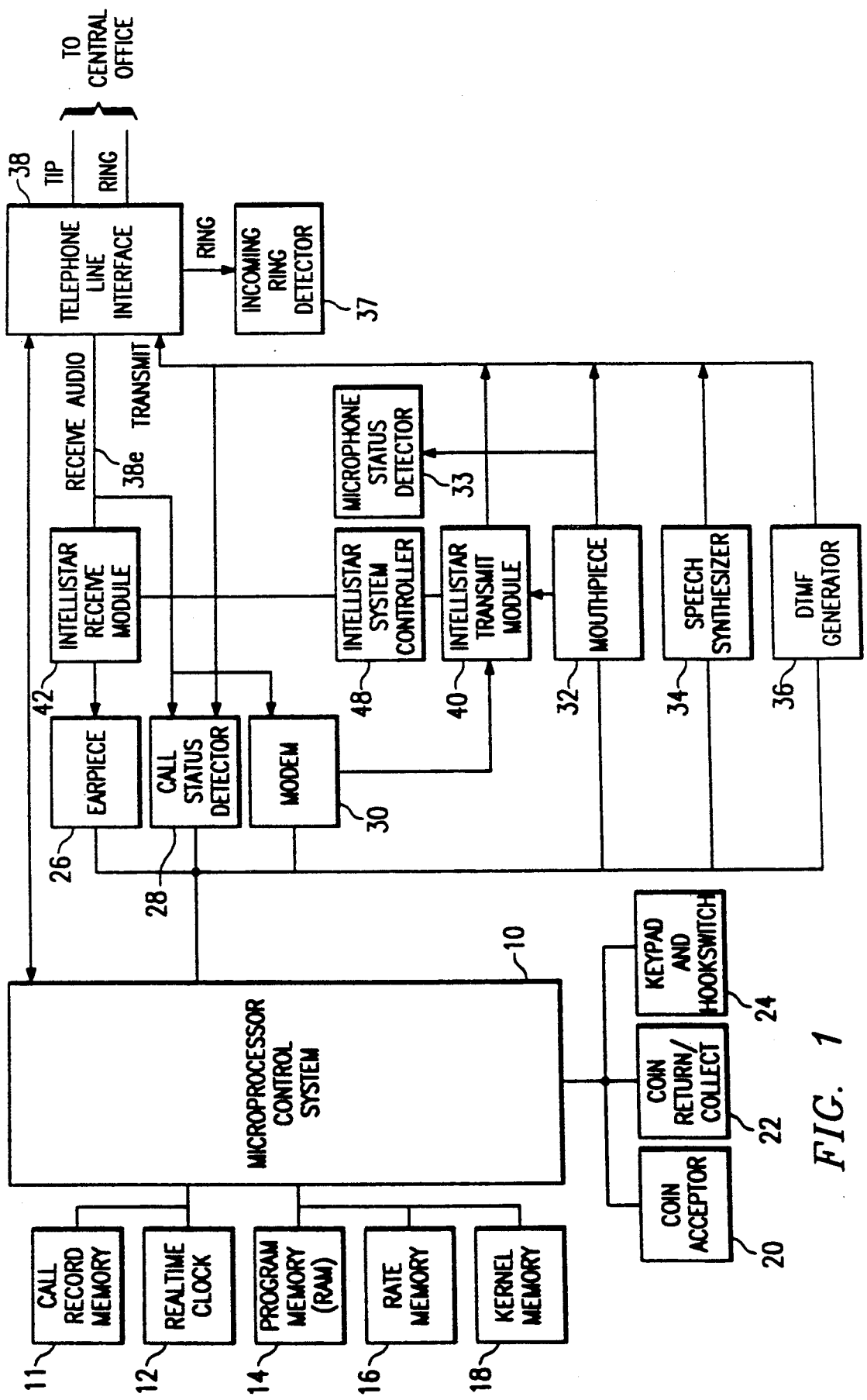
FIG. 1 is a block diagram of a pay telephone station utilizing aspects of the present invention.

FIG. 1 is a block diagram which shows the general organization of a localized telecommunications device such as a pay telephone station constructed according to the teachings of the present invention. Throughout the description of the present invention, use of the terms "pay telephone", "telephone", "station" or similar terms should be construed in their broadest sense. The teachings of the present invention are applicable to all publicly accessible telecommunications devices which charge for each call made whether or not the particular device has actual coin receipt capability. The aforementioned terms when used herein are intended to include all such telecommunications devices.

Microprocessor control system 10 comprises a suitable digital processor such as a Hitachi 6309E microprocessor. System 10 serves to monitor the input/output devices in the telephone and makes the control decisions on what actions are taken within the telephone circuitry.

The microprocessor 10 is included within the local pay telephone station so that a variety of operations can occur locally at the telephone. For example, a pay telephone station constructed according to the present invention has the capability to complete long distance calls using telephone billing account numbers. The local station can verify the billing account number and place the calls all using circuitry resident within the station. In operation, the local telephone station stores the billing account number and places the call as a direct dial telephone call. In this manner, the local station is billed for the call and the owner of the station may then bill the appropriate party for calls placed using the local station. The local station can also generate and store a record of the call which can later be retrieved to facilitate billing of the call. All these functions are controlled locally within the station by microprocessor control system 10. This local control eliminates the inefficient and time consuming need for external control at a central office or AOS.

A call record memory 11 is connected to system 10 and is used to store the billing records of completed calls. These billing records can include the type of the call that was placed, the price of the call, and the duration of the call. Microprocessor control system 10 uses a real time clock 12 to determine what time a telephone call is originated to determine if any discounts are applicable and to time the duration of the call. Operational software for the system is stored in a program memory 14. Program memory 14 may comprise, for example, two 32K×8 static RAMS which are battery backed up to make the memory non-volatile.

A rate memory 16 is connected to system 10 and also comprises a battery backed up static RAM module. This RAM module has the batteries contained within the components so that the component can be removed from one board to another board without loss of power to the memory. In one embodiment of the present invention, rate memory 16 stores rates for the telephone and configuration data for a particular telephone. In this embodiment, the rate for a particular call may be stored in the billing record for the call. In an alternate embodiment, the rate for the call may be applied in the station and the actual price of the call may be stored in the billing record for the call. In still another embodiment, the time of the call, the destination phone number and the time of day can be stored in the billing record for the call and the rate for the call can be applied at a remote location after the billing record has been transferred out of the local station to facilitate the billing of the call. This configuration data is programmable by the user through the use of a PC and a rate table editing program. By using this program, the user can enable or disable various features in a specific telephone.

A kernal memory 18 is coupled to microprocessor control system 10 and may comprise a 16K×8 EPROM. Kernel memory 18 is not volatile and stores a program which is used to boot up the telephone when the telephone is initially turned on. The kernel program also contains the program to automatically call out and redownload program or rate files if they are corrupted.

A coin acceptor 20 is monitored by microprocessor control system 10 and comprises a device which inputs whether a nickel, dime or quarter has been deposited into the system. Microprocessor control system 10 monitors coin acceptor 20 to determine if the coin acceptor mechanism is jammed. Coin return/collect system 22 is associated with acceptor 20 and is a coin escrow device which stores the coin until the decision is made by microprocessor control system 10 whether to collect or return the coins. When signaled by microprocessor control system 10, the coin return/collect system 22 mechanically routes the return of the coin or collects the coin.

Keypad and hookswitch 24 comprises two separate inputs to microprocessor control system 10. The hookswitch input of keypad and hookswitch 24 indicates to microprocessor control system 10 whether the handset of the telephone is on or off the hook. When the handset is signaled to be on the hook, the microprocessor control system 10 can terminate the call. When the hookswitch input signals microprocessor control system 10 that the handset is off the hook, microprocessor control system 10 starts monitoring the keypad input 24 and the coin acceptor 20. Keypad and hookswitch 24 does not directly control the connection of the local telephone with the telecommunications network. The keypad input of keypad and hookswitch 24 is a standard 3×4 matrix of switches used by the patron to input data into the telephone.

Controlled earpiece 26 is comprised of the hearing aid compatible audio transducer contained in pay telephone handsets, as well as a series of analog enabling switches and buffering amplifiers which are discussed later with reference to the schematic diagrams. A call status detector 28 monitors the received audio signals from the telephone line and is used to monitor the status of the telephone line. Call status detector 28 determines whether the line is busy, ringing or whether the call has been intercepted by detecting a special information tone (SIT). The functionality of call status detector 28 is fully described in U.S. Pat. No. 4,405,833 issued to Cave et al.

Modem 30 is a 1200 baud modem which can transfer phase shift key data from the microprocessor control system and receive phase shift key information from the telephone line. Modem 30 is a full duplex modem which is used for communicating accounting data and status data from the telephone. Modem 30 is also used for loading program memory or commands from a host computer or transmitting to a host computer data from the telephone. Such data from the telephone could include coin totals, billing records or error conditions.

Mouthpiece 32 comprises a standard microphone contained in the telephone handset, which also includes controlled earpiece 26, as well as a system of enabling switches and amplification circuitry. Microphone status detector 33 is used to monitor voice activity at the microphone. The microprocessor control system 10 can monitor this detector 33 in part to determine the status of the call. Speech synthesizer 34 comprises memory and control circuits which contain custom recorded speech phrases. Microprocessor control system 10 can select which of these phrases to use and play these phrases over the telephone line or into earpiece 26. Speech synthesizer 34 may comprise a General Instrument SP0264. The messages generated by speech synthesizer 34 may be used to prompt a user of the terminal or a called party. In an alternate embodiment of the present invention, a telephone terminal with video capabilities may generate simultaneous video prompts in conjunction with the speech messages. A further embodiment of the present invention uses exclusively video messages to prompt the user of the local station.

A DTMF generator 36 is coupled to microprocessor control system 10 to generate the dual tone multifrequency signals which enable the telephone to place a call. DTMF generator 36 may comprise, for example, a Sharp 4089 DTMF generator. Incoming ring detector 37 is a component which samples the incoming telephone line and detects the ring signals on that line. A telephone line interface 38 is coupled to microprocessor control system 10 and interfaces between the telephone central office and the remainder of the circuitry of FIG. 1. Telephone line interface 38 comprises multiple components which are used to interface with the standard network telephone line. Telephone line interface 38 converts the TIP and RING inputs into a four wire audio output, and also contains circuitry necessary to take the telephone on or off the hook.

Intellistar transmit module 40 is coupled between controlled mouthpiece 32 and telephone line interface 38 and comprises an additional speech synthesizer and a DTMF generator which injects additional audio signals into the transmit path. Intellistar receive module 42 comprises an attenuated audio path for use in voice mail applications, an additional DTMF receiver to detect DTMF tones transmitted through the telephone line and an additional call status detector. Intellistar system controller 48 may comprise, for example, a GTE 65SC151 microcomputer and peripheral support components. Intellistar system controller 48 controls the functions of Intellistar transmit module 40 and Intellistar receive module 42.

Figure 2:
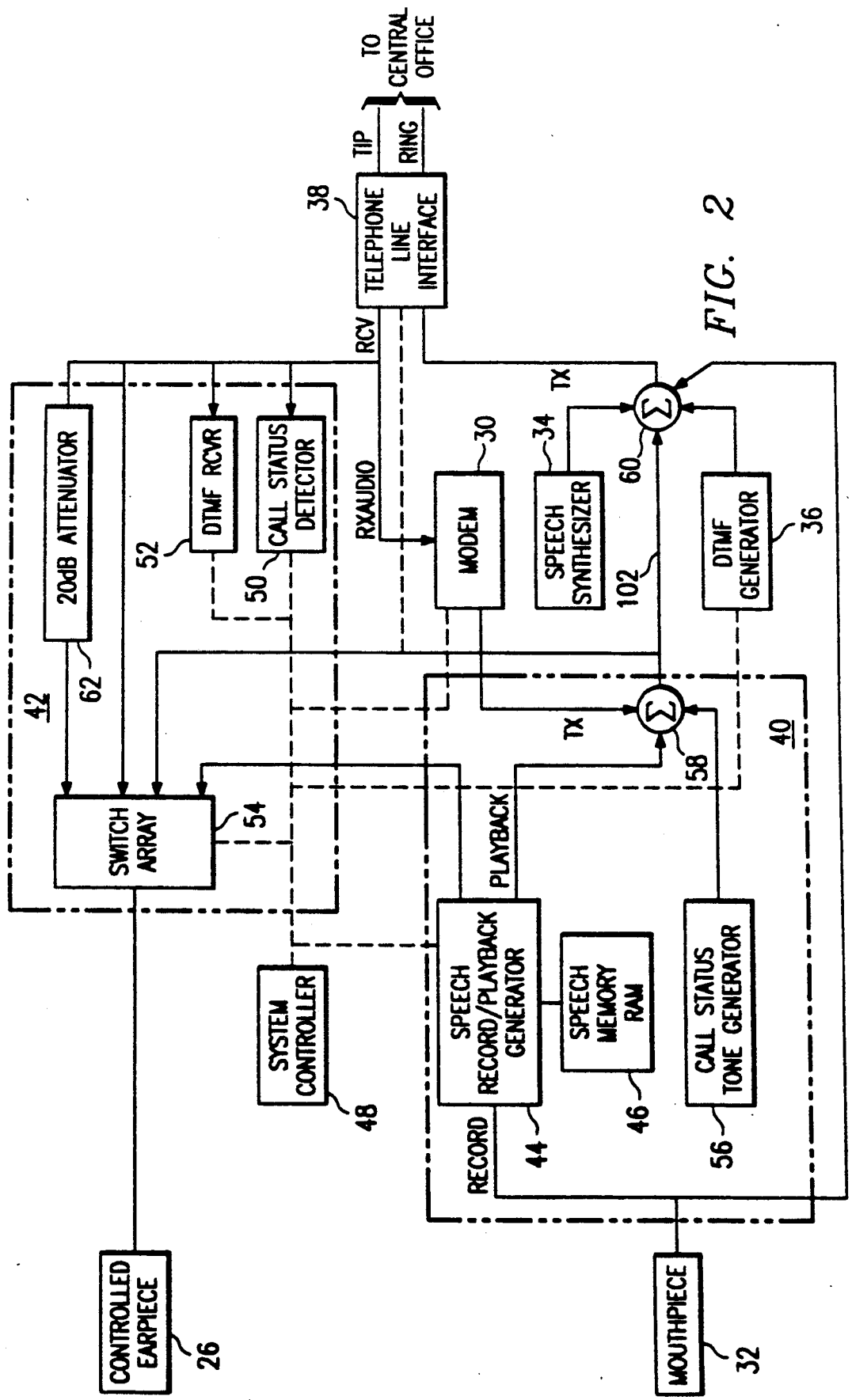
FIG. 2 is a block diagram showing greater detail of portions of the block diagram of FIG. 1.

FIG. 2 illustrates a block diagram showing greater detail of the transmit module 40 and receive module 42 of FIG. 1. The dotted connection lines between elements in FIG. 2 represent control signal paths and the solid lines represent audio signal paths. Controlled earpiece 26 and mouthpiece 32 on FIG. 2 are contained within the handset of the telephone as previously described. Mouthpiece 32 is coupled to a speech record playback generator 44 which may comprise a Toshiba TC-8830 adaptive delta PCM speech generator which can record audio tones or voices and store them in a speech memory RAM 46. Speech memory RAM 46 is a battery backed static RAM nonvolatile memory. Intellistar transmit module 40 further comprises a call status tone generator 56 which generates dial tones, ring back signals, or busy signals and presents them to the telephone line interface 38 and to the controlled earpiece 26.

Intellistar transmit module 40 further comprises a summer 58 which takes playback audio signals from speech record playback generator 44, audio signals from mouthpiece 32, audio signals from call status tone generator 56 and transmitted signals from modem 30 and sums them together and outputs them to transmit line 101. A second summer device 60 sums the signal on transmit line 102, signals from DTMF receiver 52, and switch array 54, which are portions of Intellistar receive module 42. Call status detector 50 is used for busy signal detection and may comprise a Silicon Systems 75T982 detector. DTMF receiver 52 may comprise a Silicon Systems 75T202 receiver. Switch array 54 comprises a group of discrete analog audio switches coupled to outputs from transmit module 40 and from an attenuator 62, in order to control the audio path to controlled earpiece 26. Switch array 54 comprises four discrete audio switches and the four paths are joined together using op amps so that the paths may be summed together or turned on or off independently.

Attenuator 62 provides an attenuated path for the received audio through switch array 54 into controlled earpiece 26. Attenuator 62 lowers the magnitude of the audio signal approximately 20 dB in order to reduce the volume of a busy signal from the telephone system, for example, to allow a prerecorded speech message to be transmitted over the attenuated busy signal. By having the output of summer 58 into switch array 54 and the path from telephone line interface 38 through attenuator 62 into switch array 54, it is possible to have two audio sources transmitted to controlled earpiece 26 at the same time with one of the audio signals being attenuated approximately 20 dB.

The operation of the present invention depicted in the block diagrams of FIGS. 1 and 2 is best understood when examined in the context of interactive use of the invention with a patron. A basic introduction to the interaction of the various components of the invention can be achieved through a step by step analysis of the making of a basic coin call by using a telephone constructed in accordance to the teachings of the present invention.

When a patron desires to place a coin call using the local telecommunications station, the patron removes the handset from the hookswitch 24. Microprocessor control system 10, at this time, would be running a constant control program testing the hookswitch input 24. When microprocessor control system 10 determines that the handset has been removed from hookswitch 24, it clears an audio path from telephone line interface 38 to controlled earpiece 26. Typically, the patron would then dial a microprocessor control system 10 then determines when all of the digits of the number have been collected. The software then looks to rate memory 16 to determine a rate for that call using the digits that the patron dialed. Alternatively, if the rating of the call is to be accomplished outside the phone, microprocessor control system 10 would record the destination number and the time of the day for the call.

Microprocessor control system 10 then activates speech synthesizer 34 and audio switches 54 in order to play a speech message to the patron through controlled earpiece 26 to inform the patron of how much money he needs to input in order to place the call. As discussed previously, in the alternative, the prompting messages could also be in video messages. Through the remainder of the audio and video messages. Through the remainder of the description of the invention, the functioning of the various aspects of the invention will be described in conjunction with the embodiment using solely audio embodiment described are intended to be included within the scope of the teachings of the present invention.

As the patron pus money into coin acceptor 20, coin acceptor 20 gives a signal to microprocessor control system 10 as to how much money has been received. At any point, if the patron replaces the handset back on hook switch 24, microprocessor control system 10 would activate coin return collect 22 to return the patron's money out the return slot.

Once the patron has entered enough coins, microprocessor control system 10 activates speech synthesizer 34 and audio switches 54 to play a speech message which thanks the patron. The microprocessor control system 10 then uses the telephone line interface 38 to take the telephone line off the hook and causes DTMF generator 36 to dial the number. Microprocessor control system 10 then activates call status detector 28 to determine when the call destination has answered the call. When call status detector 28 determines that the call has been answered, microprocessor control system 10 activates audio switches 54 to establish an audio path through telephone line interface 38 to controlled earpiece 26. Microprocessor control system 10 also then activates mouthpiece 32 and establishes a transmission path through telephone line interface 38. When the patron replaces the handset on hookswitch 24, microprocessor control system 10 then terminates the call by taking the telephone line interface 38 back on hook. The system of FIGS. 1 and 2 also can be used to complete a variety of other type telephone calls, such as credit card or collect calls, as will be subsequently described.

Speech File Downloader

Figures 3, 4:
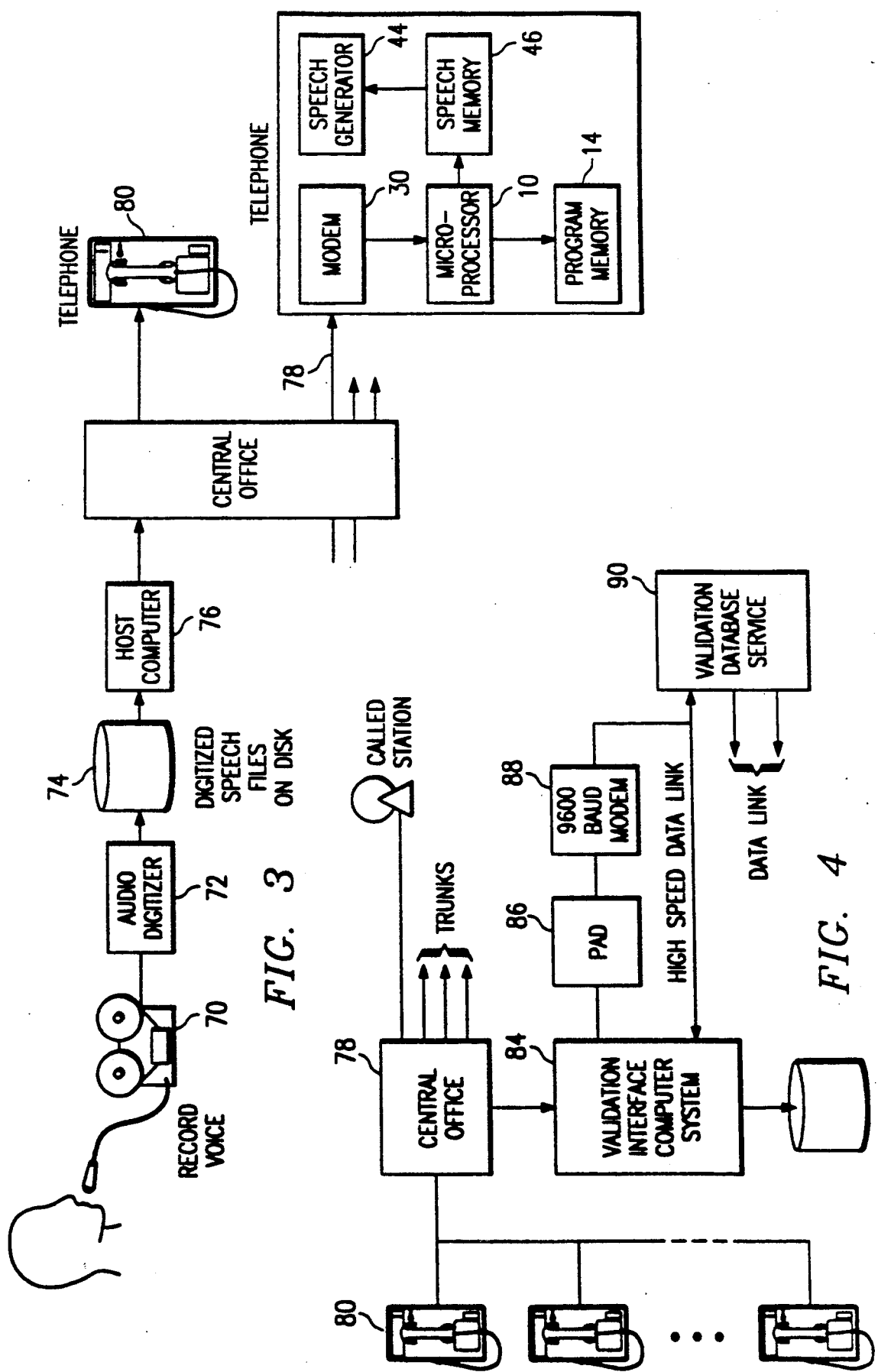
FIG. 3 is a block diagram illustrating the process of downloading speech files encompassed in the present invention.
FIG. 4 is a block diagram illustrating the validation interface computer system utilized in the present invention.

FIG. 3 is a digram showing the capability of the system constructed according to the teaching of the present invention to download speech files to be used by the telephone to prompt or give information to the patron during ordinary use of the telephone. FIG. 3 shows the recording process, the digitization process and the downloading process of the speech files into the telephone. It further shows how the telephone uses the downloaded speech files.

As shown in FIG. 3, the speech process starts by recording a human voice on magnetic tape via a tape recorder 70. Tape recorder 70 plays the recorded audio signals into an audio digitizer 72. Audio digitizer 72 takes the analog audio signals recorded and digitizes those signals and further organizes the digitized signals into speech files. The audio digitizer 72 may use a Toshiba 8830 digitizer to digitize the data and organize the speech files in an adaptive delta PCM format. The speech files are then transferred to a disk file 74 which may be physically transferred to a host computer 76. Host computer 76 may be an IBM PC style computer which is connected through telephone lines to a central office 78. Host computer 76, by running a special program called INET, can then download the speech file data through the telephone lines. INET is a commercially available software package from INTELLICALL, INC. which allows the speech files to be downloaded to a particular pay telephone through central office 78. Although FIG. 3 shows host computer 76 being connected to an individual telephone 80 through central office 78, central office 78 is not a necessary part of the data flow. Host computer 78 can be directly connected to any individual telephone 80.

Inside the individual telephone 80, the data is received by the modem 30 controlled by microprocessor control system 10, as described in conjunction with FIG. 1. Microprocessor control system 10 runs a program resident in program memory 14. This program receives the data and transfers t to speech memory 46. This allows speech generator 44 to access the data and play the correct phrases during operation of telephone.

The Validation Interface

FIG. 4 shows a block diagram of the validation interface computer system. This aspect of the invention is used by a telephone in the field to call in and connect to a high speed data link in order to validate a telephone billing account number that has been input by a patron. Individual telephone 80, shown in FIG. 4, calls in to a number which is stored in rate memory 16 (FIG. 1) through the central office 78 to connect to a validation interface computer system 84. Individual telephone 80 then uses modem 30 to communicate with a similar modem contained within the validation interface computer system 84. Validation interface computer system 84 then requests the telephone to transmit the information about the call. This information includes the destination number, the telephone billing account number and the identification number of the telephone. The validation interface computer system 84 has the capability to handle up to 32 incoming telephones.

Validation interface computer system 84 then takes the data received from the telephone and changes the format of the information and sends it out through a packet assembly and disassembly device (PAD) 86. PAD 86 transmits the data over the high speed data link using a 9600 baud modem 88. The modem 88 then transmits the data over high speed data lines commercially available for lease from long distance carriers which supply a validation data base service 90. Validation data base service 90 then determines if the billing account number transmitted is a valid or invalid number and transmits that information back through modem 88 and PAD 86. Validation interface computer system 84 then changes the format of the message back to a format individual telephone 80 can understand and transmits the data to the telephone 80. The telephone then terminates the communication with the validation interface computer system 84. Validation interface computer system 84 records in a log file 92 information about the transaction. The information stored in log file 92 is used to verify billing and create a data base of valid and invalid telephone billing account numbers.

FIG. 4 demonstrates an important technical advantage of the present system. If the telephone 80 and the validation interface computer system 84 have established contact, the validation process occurs without the necessity of a central office providing special signalling, verification or billing. In prior systems, the validation function has been done in the central office. By placing the validation process circuitry in the individual telephones, an entire step in the validation process is eliminated.

System Schematic Diagrams

Figure 5A:
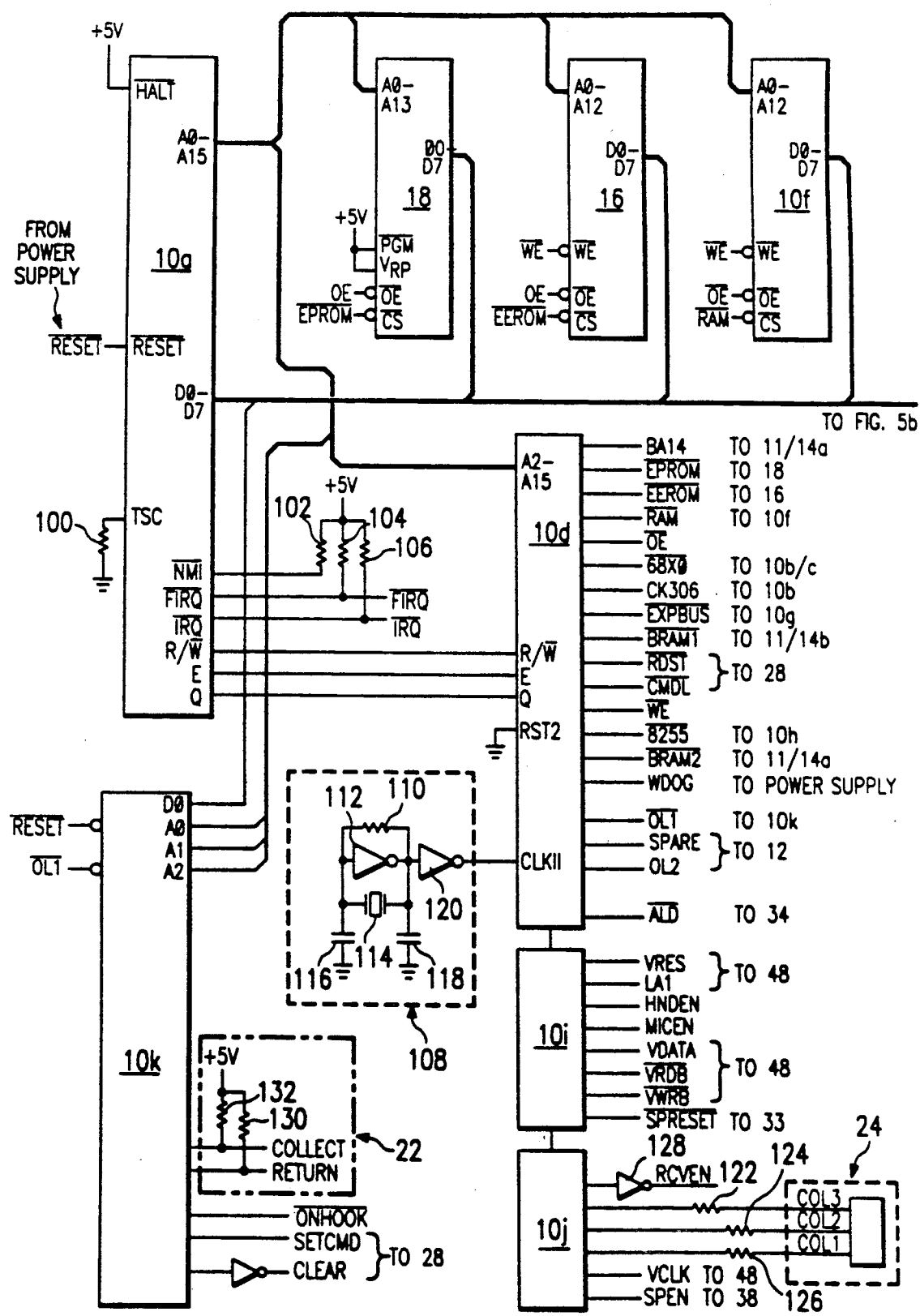
FIGS. 5a-7c are schematic diagrams showing a pay telephone station constructed in accordance with the present invention in detail.

FIGS. 5a–, 6a–c, and 7a–c are more detailed schematic representations of the telephone terminal represented in block diagrams in FIGS. 1 and 2. Referring to FIG. 5a, several of the components which comprise microprocessor control system 10 are represented. Component 10a shown on FIG. 5a may comprise a Hitachi 6309E microprocessor chip. Microprocessor 10a is the system controller for the phone. It controls the input/output devices and also communicates to slave processors in the system.

Microprocessor 10a has its inverse HALT signal connected to a +5 volt power supply. Microprocessor 10a is also connected to an inverse RESET signal. The inverse RESET signal is generated by the power supply and is used to hold all the logic systems in a reset state until the power supply has stabilized. The TSC signal is connected through a resistor 100 to ground. An inverse NMI signal is connected to +5 volt power supply through resistor 102. An inverse FIRQ signal is also connected from microprocessor 10a to a +5 volt supply through a resistor 104. An inverse IRQ signal is also connected to a +5 volt supply through a resistor 106. The inverse FIRQ and inverse IRQ signals are also used in other places in the telephone and will be represented by the same symbols throughout the schematic diagrams shown in FIGS. 5a through 7b. The inverse R/W signal, the E signal, and the Q signal serve to couple microprocessor 10a with a custom gate array 10d. Microprocessor control 10a also drives address lines A0–A15 and data lines D0–D7.

Address lines A0–A13 and data lines D0–D7 serve to couple microprocessor 10a with kernel memory 18. Kernel memory 18 may comprise a 16K×8 27C128 EPROM manufactured by Texas Instruments. As shown on FIG. 5a, kernel memory 18, in addition to address lines A0–A13 and data lines D0–D7, is coupled to an inverse PGM signal and a VRP signal which are both coupled to a +5 volt supply. Kernel memory 18 is selected using an OE signal which is coupled to the inverse OE pin on the chip and an inverse EPROM signal which is coupled to the inverse CS signal.

Kernel memory 18 stores the program that enables the phone to boot up as well as diagnostic routines to enable the phone to tell if all required software is operational. Kernel memory 18 also stores a program that allows the phone to down load a new operating program from a remote host computer should the operational software stored locally in the phone become disrupted.

The inverse OE signal and EPROM signal are both generated by gate array 10d. Gate array 10d comprises an application specific integrated circuit which provides chip select signals and control signals for a variety of components in the system. Gate array 10d may comprise an SGS Thompson HB54M custom 2000 gate array in a 68 PLCC package. Rather than implementing the glue logic necessary for the operation of microprocessor control system 10 using discrete logic gates, the system is greatly simplified by having the necessary control signals generated by the single gate array 10d.

Address lines A0–A12 and data lines D0–D7 couple microprocessor 10a to rate memory 16 as shown in FIG. 5a. Rate memory 16 ay comprise a Dallas Semiconductor DS1225 battery backed static RAM. This non-volatile memory device is capable of being reprogrammed remotely and stores rate information and location specific operating parameters. Rate memory 16 uses inverse WE signal which is connected to the inverse WE pin on the chip. Rate memory 16 also uses OE signal which is connected to the inverse OE pin on the rate memory 16 chip. Inverse EEROM signal is connected to the inverse CS pin on rate memory chip 16. These signals all serve to enable rate memory 16 and are all generated by gate array 10d.

Microprocessor control system 10 further comprises scratch pad memory chip 10f which may comprise, for example, a Hitachi 6264 8K×8 random access memory chip. As shown in FIG. 5a, address lines A0–A12 and data lines D0–D7 connect scratch pad memory 10f with microprocessor chip 10a. Scratch pad memory 10f uses inverse WE signal which is connected to the inverse WE pin of the chip. Inverse OE signal is connected to the inverse OE pin on the chip. Inverse RAM signal is connected to the inverse CS pin on scratch pad memory 10f. These signals are used to enable scratch pad memory 10f and are all generated by gate array 10d. Scratch pad memory 10f is used by microprocessor 10a as a stack RAM for storing registers during interrupts, intermediate results and other transient data storage.

As discussed previously, address lines A2–A15 couple microprocessor 10a to gate array 10d. As shown in FIG. 5a, gate array 10d generates control signals BA14, inverse EPROM, inverse EEROM, inverse RAM, inverse OE, inverse 68XO, CK306, inverse EXPBUS, inverse BRAM1, inverse RDST, inverse CMDL, inverse WE, inverse 8255, inverse BRAM2, WDOG, inverse OL1, SPARE, OL2 and inverse ALD. Gate array 10d communicates with microprocessor 10a through address lines A2–A15 and through a R/inverse W signal, an E signal and a Q signal. The RST2 pin is connected to ground.

Figure 5B:
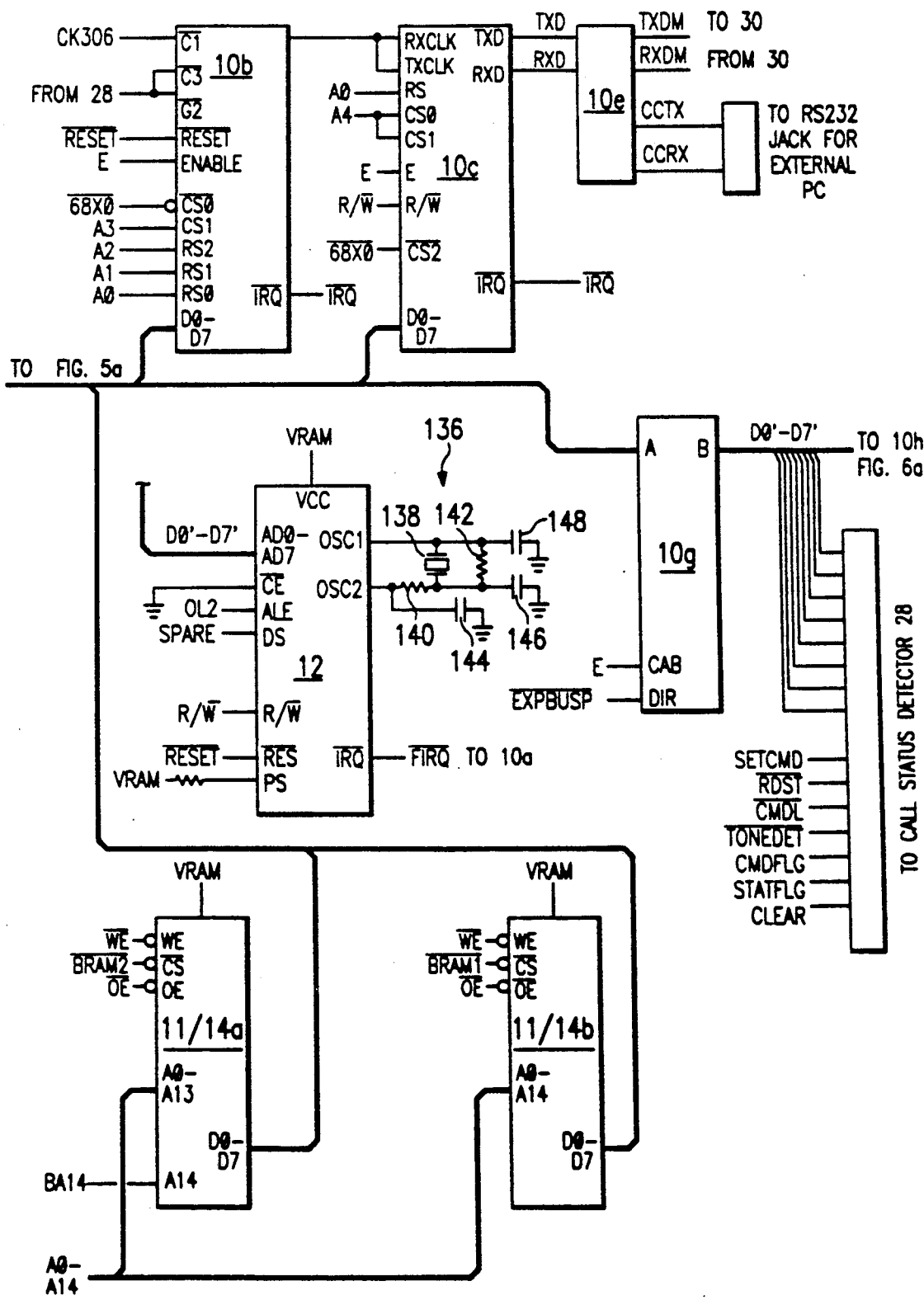

BA14 is a control signal which is transmitted by gate array 10d to a static RAM 11/14a which is shown on FIG. 5b. Inverse EPROM is a chip select signal generated by gate array 10d and transmitted to kernel memory 18. Inverse EEROM and inverse RAM are similar chip select signals transmitted to rate memory 16 and scratch pad memory chip 10f, respectively. The inverse OE signal is generated by gate array 10d to select these three elements as well as other input/output elements of the system. The 68XO signal is a chip select signal generated by gate array 10d and transmitted to a counter timer 10b and a universal asynchronous receipt transmit device 10c (UART). The CK306 signal is a clock signal also generated by gate array 10d and transmitted to counter timer 10b. The inverse EXPBUS signal is a control signal transmitted to an expansion bus 10g. The inverse BRAM1 and inverse BRAM2 signals are control signals used to enable RAM chips 11/14a and 11/14b. The inverse RDST and inverse CMDL signals are control signals generated by the gate array 10d and transmitted to the call status detector 28. The inverse WE signal is transmitted throughout the system and is used to write data into any memory or I/O device. Inverse 8255 is a chip select signal for a programmable I/O 10h. The WDOG signal is generated by the gate array 10d and transmitted to the power supply. The WDOG signal is a supervisory signal which is used to inform the power supply that something is wrong with the system and it needs to be shut off and then powered up again. The inverse OL1 signal is a chip select signal transmitted to programmable I/O 10k. The SPARE signal is a control signal transmitted by gate array 10d to real time clock 12. The OL2 signal is a control signal which is used to latch an address into the real time clock 12. The inverse ALD signal is a control signal used to latch an address into the speech synthesizer 34.

The CLKII pin on gate array 10d is connected to an oscillator 108 which comprises a resistor 110, an inverter 112, and a crystal 114 connected in parallel. Each node of this parallel connection is connected to ground through capacitors 116 and 118, respectively. The output node is connected to the CLKII pin on gate array chip 10d through an inverter 120 as shown in FIG. 5a. Oscillator 108 serves as the system oscillator and may use, for example, an 11.0592 megahertz crystal to provide the clock signal for microprocessor 10a.

Microprocessor control system 10 further comprises a gate array 10i also shown on FIG. 5a. Gate array 10i comprises control logic which is actually resident on the same chip as gate array 10d. The gate array 10i comprises control logic which services a conceptually distinguishable portion of the system and hence is schematically represented as a discrete element. Gate array 10i generates control signals for the Intellistar system controller 48, the controlled earpiece 26 and the speech synthesizer 34.

Gate array 10i uses control signals VRES to reset the Intellistar system controller 48. Signals LA1, VDATA, inverse VWRB and inverse VRDB are used to transmit commands to the Intellistar system controller 48 or receive status information. HNDEN and MICEN signals are generated by gate array 10i to enable the earphone 26 and mouthpiece 32, respectively. An inverse SPRESET signal is generated by gate array 10i to reset speech synthesizer 34.

The interface between microprocessor control system 10 and keypad and hookswitch 24 is accomplished by an additional gate array 10j, also shown on FIG. 5a. Gate array 10j also comprises control logic which is resident on the same chip as gate array 10d. It is also shown as a discrete element because it generates control signals for a conceptually distinct portion of the system. Gate array 10j generates signals COL3, COL2 and COL1 through resistors 122, 124 and 126, respectively. An RCVEN signal is generated by gate array 10j and is transmitted through inverter 128 to the controlled earpiece 26 to disconnect the telephone line from the earpiece 26 to let other audio information into the controlled earpiece 26. Gate array 10j also generates an VCLK signal which is an additional interface signal transmitted to the Intellistar system controller 48. A SPEN signal is generated by the gate array 10j to control the connection from the speech synthesizer 34 through the telephone line interface 38.

Microprocessor control system 10 further comprises a programmable I/O chip 10k also shown on FIG. 5a. Programmable I/O chip 10k comprises a Signetics 5090 addressable 8 bit latch with high current outputs suitable for driving relays. Programmable I/O chip 10k uses signals D0, A0, A1 and A2 to communicate with microprocessor 10a. Programmable I/O chip 10k is set to a known state by inverse RESET signal and is selected by the inverse OL1 signal generated by gate array 10d. In addition, as shown in FIG. 5a, programmable I/O chip 10k generates COLLECT and RETURN signals which when connected with pull up resistors 130 and 132 to a +5 volt supply, drive the mechanisms in the coin return/collect 22. The COLLECT and RETURN signals are input into a SGSL298 Relay Driver which powers a solenoid which electromechanically enables the return or the collection of coins placed in the coin acceptor 20. Programmable I/O chip 10k also communicates with the call status detector 28 using the SETCMD signal and the CLEAR signal. Programmable I/O chip 10k also generates an inverse ONHOOK signal which drives a relay resident in telephone line interface 38b.

Further components of microprocessor control system 10 are shown in the continuation of the schematic diagram shown in FIG. 5b. Microprocessor control system 10 further comprises a counter/timer 10b. Counter/timer 10b may comprise, for example, a Hitachi 6340 counter/timer chip. This chip uses the clock signal CK306 generated by gate array 10d coupled to the inverse C1 pin. The inverse C3 and inverse G2 pins are coupled to call status detector 28. The inverse RESET pin is connected to the inverse RESET signal which is generated by the power supply. The ENABLE pin is connected to the E signal. The inverse CSO pin is connected to the inverse 68XO control signal generated by gate array 10d. The CS1 pin, RS2 pin, RS1 pin and RS0 pin are coupled to address lines A3, A2, A1 and A0, respectively. Counter/timer 10b is also coupled to data lines D0-D7. The inverse IRQ pin is connected to inverse IRQ interrupt signal.

An output 01 of counter/timer 10b is coupled to an RXCLK and a TXCLK pin on UART 10c. UART 10c may comprise, for example, a Hitachi 6350 universal asynchronous receipt transmit device. The RS pin of UART 10c is coupled to the A0 address line signal The CSO and CS1 pins are coupled to the A4 address line signal. The E pin is coupled to the E signal and the R/inverse W pin is connected to the R/inverse W signal. The inverse CS2 pin is connected to the inverse 68XO control signal generated by gate array 10d. UART 10c is also coupled to datalines D0-D7. The inverse IRQ pin is connected to the inverse IRQ interrupt signal. UART 10c generates the RXD signal and the TXD signal from its RXD pin and TXD pin, respectively. These signals couple UART 10c to a gate array 10e.

Gate array 10e comprises logic circuitry which is also actually resident on the same chip as gate array 10d. Gate array 10e transmits a signal TXDM and receives a signal RXDM in order to communicate with modem 30. Gate array 10e is also coupled to an RS232 jack through which signals CCTX and CCRX may be transmitted and received to communicate with an external computer.

Microprocessor control system 10 further comprises an expansion bus buffer 10g. Expansion bus buffer 10g may comprise, for example, an HC646 bus driver chip. Expansion bus buffer 10g buffers the data bus to prevent excessive loading on the bus because of so many components being attached to it. Expansion bus buffer 10g is connected through its A set of pins to data lines D0-D7 in counter timer 10b. Expansion bus buffer then transmits data signals D0'-D7' through its B set of pins. The D0'-D7' signals are used to couple chip 10g with call status detector 28 and programmable I/O 10h which is shown on FIG. 6a. Expansion bus buffer 10g has its DIR pin connected to the inverse EXPBUSP signal which enables the chip to transmit data. It further has its CAB pin connected to the E signal which is used for timing purposes.

The SETCMD, inverse RDST, inverse CMDL, inverse TONEDET, CMDFLG, STATFLG and CLEAR signals are all used to interface with call status detector 28. Call status detector 28, as previously discussed, is a circuit of a type which is fully described in U.S. Pat. No. 4,405,833 issued to Cave et al.

Real time clock 12 is also shown on FIG. 5b, and may comprise, for example, a Motorola 146818A real time clock chip. Real time clock 12 is used to store the year, month, week, day, time of day and is also used to generate other timing functions. Real time clock 12 is connected to the D0'-D7'signals at its AD0-AD7 pins. The $V_{cc}$ pin is connected to a VRAM signal as is the PS pin. The VRAM signal is a battery power supply in the system which powers the real time clock 12 even when there is a loss of external power to the phone. The inverse CE pin and the CKPS pin are connected to ground. The ALE pin is connected to the OL2 signal and the DS pin is connected to the SPARE signal. The R/inverse W pin is connected to the R/inverse W signal. The inverse RES pin is connected to the inverse RESET signal. The inverse IRQ pin is connected to the inverse FIRQ signal. The OSC1 and OSC2 pins are connected to an oscillator 136 comprising crystal 138, resistors 140 and 142, and capacitors 144, 146 and 148 connected as shown in FIG. 5b. Oscillator 136 runs at 32.768 kilohertz and is used by real time clock 12 to keep track of time.

The call record memory 11 and program memory 14 are resident on chips 11/14a and 11/14b shown in FIG. 5b. Chip 11/14a and chip 11/14b may comprise, for example, Hitachi 62256 CMOS static RAMs. They consist of 32K×8 memory locations. The operating software for the system and the call records are both stored on these chips.

Both chips 11/14a and 11/14b are connected to a VRAM power supply signal. By using the VRAM signal, RAM 11/14a and RAM 11/14b both become battery backed random access memory chips which allow for nonvolatility of the memory and greater system reliability in the event of an external power failure. RAM 11/14a is write enabled by the inverse WE signal connected to its inverse WE pin. The RAM 11/14a is selected by the inverse BRAM2 signal coupled to its inverse CS pin. The OE pin is connected to the inverse OE signal. RAM 11/14a is coupled to address lines A0-A13. Its A14 pin is connected to the BA14 signal. The BA14 signal is used to divide the memory space on chip 11/14a into two 16K×8 blocks. This allows microprocessor 10a to address more than 64K memory locations by banking in these two 16K blocks. Chip 11/14a is controlled by the BA14 signal, the inverse BRAM2 signal, the inverse WE signal and the inverse OE signal all of which are generated by gate array 10d. Chip 11/14a is coupled to microprocessor 10a through datalines D0-D7.

The second RAM 11/14b is write enabled by the inverse WE signal which is coupled to its inverse WE pin. The inverse CS pin is connected to the inverse BRAM1 signal which is used to select RAM 11/14b. Inverse BRAM1 and inverse WE are both signals generated by gate array 10d. The inverse OE pin is connected to the inverse OE signal which is an additional control signal also generated by gate array 10d. RAM 11/14b is also coupled to microprocessor 10a through address lines A0-A14 and data lines D0-D7.

Referring to FIG. 6a, further components of the block diagram of the present invention shown in FIG. 1 are shown in schematic form. A further component of microprocessor control system 10 is represented on FIG. 6a by programmable I/O 10h. Programmable I/0 10h may comprise, for example, a Toshiba 82C55 programmable input output device. Programmable I/O 10h is used to read data from peripheral devices and to communicate that data and other status information to the microprocessor 10a.

Programmable I/O 10h has its data pins D0-D7 connected to dataline signals D0'-D7' respectively, which are transmitted by expansion bus driver 10g shown on FIG. 5a. Programmable I/O 10h has its RESET pin coupled to the RESET signal which is used to hold the device in a known state during a system reset sequence. The inverse RD pin is coupled to the inverse OE signal, the inverse WR pin is coupled to the inverse WE signal and the inverse CS signal is coupled to the inverse 82SS signal. These three control signals are generated by gate array 10d. Programmable I/O 10h further has its AO pin connected to the AO address line signal and its A1 pin connected to the A1 address line signal. These address line signals couple programmable I/O 10h to microprocessor 10a shown on FIG. 5a.

Figure 6B:
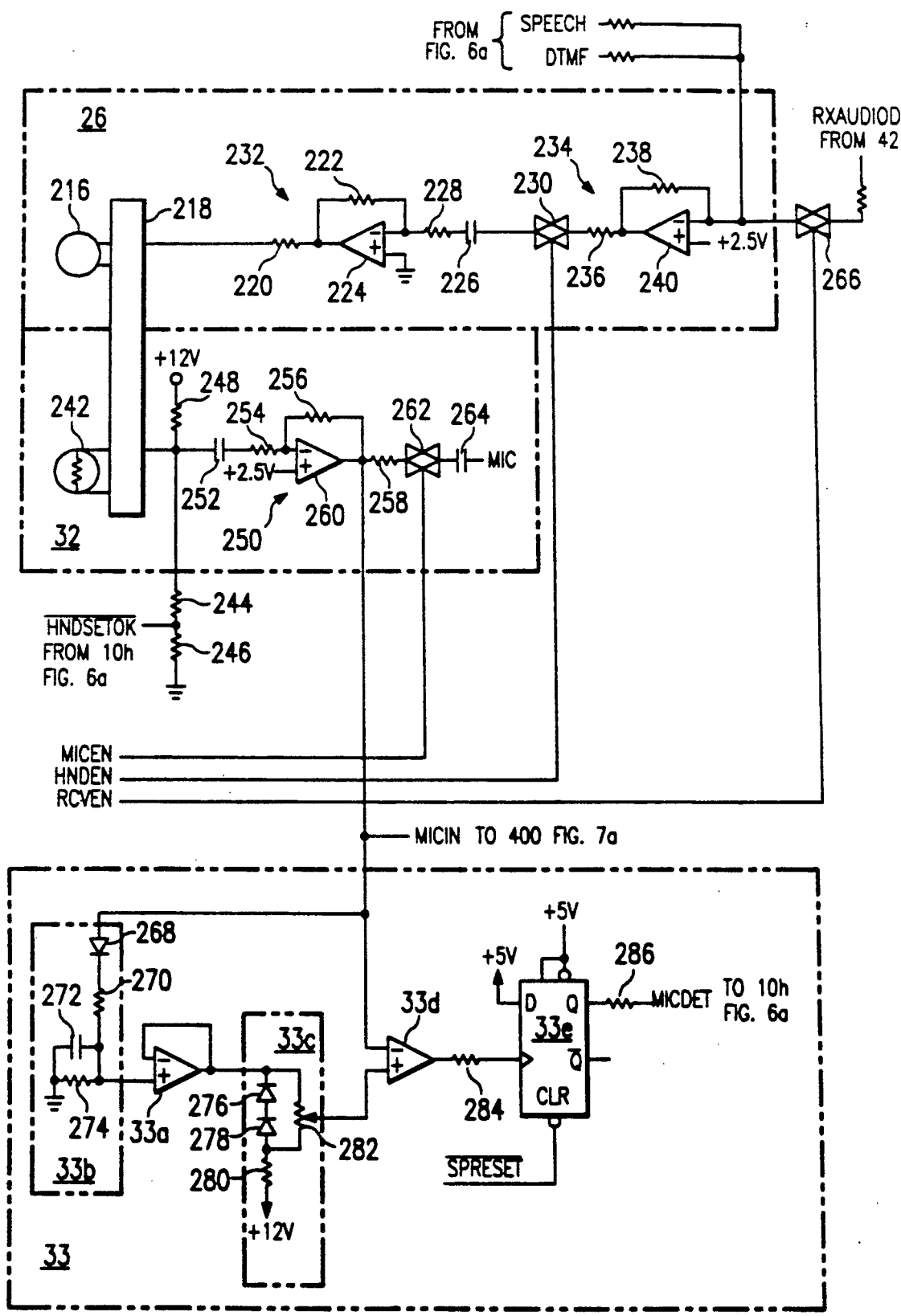

Programmable I/O 10h has its PCO pin coupled to the inverse HNDSETOK signal which couples programmable I/O 10h to the mouthpiece 32 shown in FIG. 6b. The inverse HNDSETOK signal is used to communicate the operational status of the handset of the phone. The PB1 pin is coupled to the inverse TONEDET signal and the PB2 pin is coupled to the CMDFLG signal. The PB3 pin is coupled to the STATFLG signal. These three signals are control signals generated by call status detector 28.

The PB4 pin of programmable I/O 10h is coupled to the inverse RING signal. The inverse RING signal is a status signal generated by incoming ring detector 37 to communicate the fact that an incoming ring has been detected. The PB5 pin is coupled to the SBY signal. The SBY signal is generated by the speech synthesizer 34 to inform the microprocessor that the speech synthesizer is speaking. The PB6 pin is coupled to the REVERT. signal which is a status signal generated by telephone line interface 38 to indicate there is positive loop current in the telephone line.

The PA1 and PAO pins of programmable I/O 10h are connected through resistors 152 and 154 to components which function as coin acceptor 20 shown on FIG. 1. Coin acceptor 20 comprises decoder chip 156 and diodes 158 and 160 coupled as shown in FIG. 6a.

The PC5 pin is coupled to the inverse MINT signal which is an interface signal generated by Intellistar system controller 48. The PC3 pin is coupled to the MICDET signal. The MICDET signal is generated by the microphone status detector 33 to indicate activity at the local handset. The PC2 pin is coupled to the VDATA signal. The VDATA signal is an interface signal which is used to receive status data from the Intellistar system controller 48. The PC1 pin is coupled to the REVERT−signal signal which is generated by the telephone line interface 38 to indicate loop current in the minus direction.

The PA3 pin is coupled through a resistor 164 to the HANDSET signal and keypad hookswitch 24. The HANDSET signal is generated by the keypad hookswitch 24 shown on FIG. 1 and informs the system that a patron has removed the handset from its hook or that the patron has returned the handset to the hook. The PA4, PA5, PA6 and PA7 pins are coupled to the ROW1, ROW2, ROW3 and ROW4 signals used by keypad hook switch 24 to decode which key a patron has pressed. These signals, along with the HANDSET signal, are coupled to a connector 166 which comprises a portion of keypad hookswitch 24.

Also shown in FIG. 6a is a schematic representation of DTMF generator 36 shown in FIG. 1. The OTMF generator 36 comprises a latch 168 and a DTMF generator chip 170. Latch 168 may comprise, for example, an HC374 Octolatch. DTMF generator chip 170 may comprise, for example, a Sharp 4089. Chip 170 is coupled to a crystal 172 which operates at 3.57 MHz and is used for timing purposes. Latch 168 has its D lines connected to dataline signals D0'-D7' generated by expansion bus buffer 10g. Latch 168 is also coupled to inverse DTMFEN signal which is generated by gate array 10d. The Q pins of latch 168 are coupled to the C1-C4 pins and R1-R4 pins of DTMF generator 170. In operation, DTMF generator 36 latches data generated by the expansion bus buffer 10g using latch 168 controlled by the control signal inverse DTMFEN. The latched data is used to select a tone pair to be generated by DTMF generator chip 170. This tone pair is transmitted to the TONE pin of chip 170 to the phone line and is used by the phone to dial into a central office. The DTMF generator chip 170 also generates a TONEOUT control signal which is used to reduce the amplitude in the audio path while a DTMF tone is being transmitted.

The TONE pin of chip 170 is coupled to summer 60 and to ground through resistor 174 contained in summer 60. Summer 60 is an analog summing device which combines tone and speech signals which are being transmitted from the phone. DTMF generator chip 170 is connected to a gain stage 96 through capacitor 176. Gain stage 96 comprises resistors 178 and 180 and an op amp 182 connected as shown in FIG. 6a. The SPOUT signal enters summer 60 through a resistor 184. The SPOUT signal carries speech signals transmitted to summer 60 from the speech synthesizer 34 shown in FIG. 1. The SPOUT signal is transmitted through a low pass filter 94 which comprises capacitor 186, resistor 188, capacitor 190 and op amp 192 coupled as shown in FIG. 6a. Low pass filter 94 takes the SPOUT signal transmitted by the speech synthesizer 34 and filters out the high frequency components. The signal then travels through capacitor 194 where the SPEECH signal is transmitted to controlled earpiece 26 shown in FIG. 6b from a node 196. Node 196 is coupled to an analog switch 98 through resistor 198. Analog switch 98 is controlled by the SPEN signal, which when active, allows the filtered SPOUT signal to be transmitted to node 200. At node 200, the amplified signal from the TONE pin of chip 170 is coupled to the SPOUT signal after passing through capacitor 202 and resistor 204. In addition, the signal transmitted by transmit line 101 from the Intellistar transmit module 40 (FIG. 2) is also coupled to node 200. The combined signals travel from node 200 through a gain stage 100 which comprises an op amp 206 and resistors 208 and 210 coupled as shown in FIG. 6a. The summed signal from summer 60 is then transmitted to the phone line through the telephone line interface 38 shown on FIG. 6b.

Referring now to FIG. 6b, a schematic representation of the circuitry required for controlled earpiece 26 is depicted. Controlled earpiece 26 includes a hearing aid compatible speaker 216 coupled to a hand set connector 218. The audio signals are transmitted to the speaker 216 through amplifier stages indicated generally at 232 and at 234. Amplifier stage 232 comprises resistors 220, 222 and 226, capacitor 228 and op amp 224 coupled as shown in FIG. 6b. Amplifier stage 234 comprises resistors 236 and 238 and op amp 240 coupled as shown in FIG. 6b. Amplifier stages 232 and 234 are separated by analog switch 230 which is controlled by the HNDEN control signal generated by gate array 10i. The HNDEN signal is used in conjunction with analog switch 230 to completely disable the earpiece 26 and not allow any audio signals to reach the patron. In contrast, a second analog switch 266 is controlled by the RCVEN signal generated by gate array 10j and only cuts off audio signals coming from the telephone line interface 38. The SPEECH and DTMF signals may then be transmitted to the controlled earpiece 26 without interference from audio signals coming from the telephone line. The SPEECH and DTMF signals which carry audio signals from the speech synthesizer 34 and the DTMF generator 36, respectively, are accordingly coupled to the input of amplification stage 234 immediately behind analog switch 266 which is coupled to the RCVEN signal.

The mouth piece assembly 32 comprises a transducer 242 which is attached to handset connector 218. The signal from the hand set is used to generate the inverse HNDSETOK signal which is transmitted by way of resistors 244 and 246 to programmable I/O 10h shown in FIG. 6a. A resistor 248 connected to a +12 volt supply completes a voltage divider used to bias the inverse HINDSETOK signal as shown in FIG. 6b. The audio signal is transmitted through an amplifier stage 250 comprising capacitor 252, resistor 254, resistor 256 and resistor 258 and op amp 260. After passing through an analog switch 262 and capacitor 264, the MIC signal is transmitted to the summer 60 shown in FIG. 6a where it enters the audio path at node 200. Analog switch 262 is controlled by the MICEN control signal generated by gate array 10i in order to enable or disable the mouthpiece 32.

As shown in FIG. 6b, the output of amplification stage 250 is transmitted prior to the analog switch 262 to the microphone status detector 33. The output of amplification stage 250 is also used in the MICIN signal for a speech synthesizer 400 which will be described in conjunction with FIG. 7a. The microphone status detector 33 utilizes an op amp 33d which has its first input coupled to the signal coming directly from the mouthpiece 32. The second input to op amp 33d is a signal which is processed through circuit 33b, amplifier 33a and circuit 33c to give an average level of the signal level at the microphone. Circuit 33b is a filter which comprises diode 268, resistor 270, capacitor 272 and resistor 274 coupled as shown in FIG. 6b. The filtered signal is then passed through amplifier 33a to circuit 33c which comprises a variable threshold voltage generator. The variable threshold voltage generator circuit 33c comprises diodes 276 and 278, resistor 280 and variable resistor 282. Variable threshold voltage generator circuit 33c transmits a signal to comparator op amp 33d which serves as a reference level to compare with the unfiltered signal coming out of the microphone. The output of comparator op amp 33d is transmitted through resistor 284 into latch 33e, which is coupled as shown in FIG. 6b to a +5 voltage source. Latch 33e has its CLR pin connected to the inverse SPRESET signal generated by gate array 10i. The output of latch 33e is transmitted from the Q pin and through resistor 286 to create signal MICDET which is transmitted to programmable I/O 10h shown on FIG. 6a.

Figure 6C:
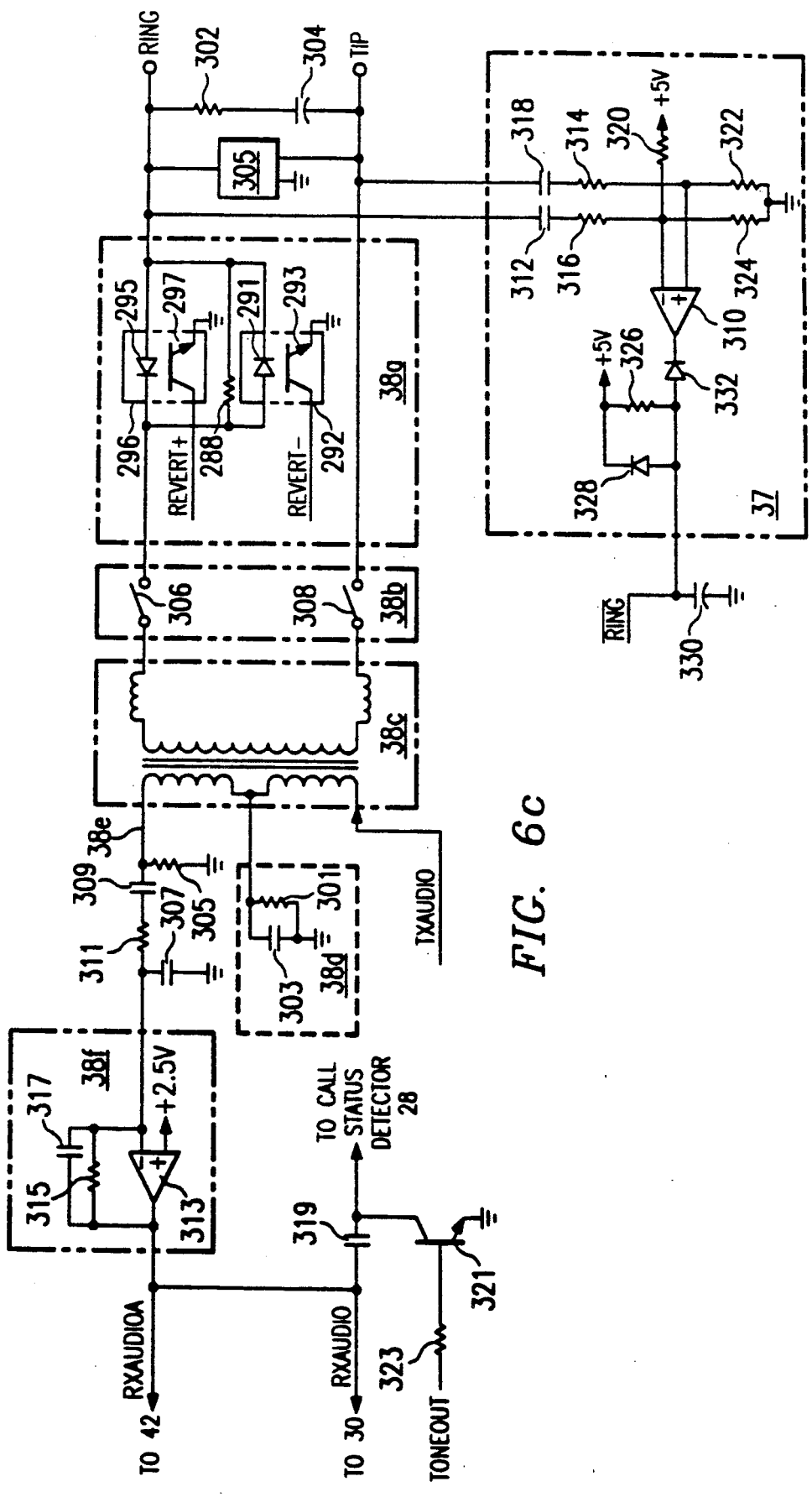

The telephone line interface 38 is shown on FIG. 6c. Telephone line interface 38 comprises a current detector 38a which is coupled to the ring input from the telephone line. The current detector 38a comprises a parallel connection of a first optical coupling 296, a resistor 288 and a second optical coupling 292. The first optical coupling 296 comprises a light emitting diode 295 and a transistor 297. The second optical coupling 292 similarly comprises a light emitting diode 291 and a transistor 293. The current detector 38a operates to detect current in either the positive or negative direction through the telephone line. Current in the positive direction in the telephone line will cause the REVERT+ signal to be active, while current in the negative direction in the telephone line will cause the REVERT− signal to be active. When current in the positive direction exist in the telephone line, diode 295 will emit light which will cause transistor 297 to turn on, and will activate the REVERT. signal. Current in the negative direction in the telephone line will similarly cause the REVERT− signal to be activated. The optical couplings 296 and 292 allow for the current detector 38a to detect current in the telephone line while still remaining electrically isolated from the telephone line as is required by FCC regulations.

A resistor 302 and a capacitor 304 are connected in series between the ring input and the tip input from the telephone line. This RC coupling is also required by FCC regulations. Resistor 302 and capacitor 304 allow the telephone company to detect that a device is connected to the telephone line at the particular location. A gas discharge tube 305 is coupled between the TIP and RING inputs and ground and is used to protect the circuitry from lightening discharges on the phone line. Telephone line interface 38 further comprises a hook relay 38b. Hook relay 38b comprises individual relays 306 and 308 connected to the RING and TIP inputs respectively. Individual relays 306 and 308 are controlled by the microprocessor control system 10.

Telephone line interface 38 further comprises isolation transformer 38c which is a transformer included in the system to comply with FCC requirements that the telephone electronics must be electrically isolated from the telephone line electronics. As shown on FIG. 6b, the TXAUDIO signal enters the isolation transformer 38c and is thereby transmitted to the telephone line. The TXAUDIO signal is generated by summer 60 which is shown on FIG. 6a.

Telephone line interface 38 further comprises a balancing network 38d. Balancing network 38d comprises a parallel coupling of a resistor 301 and a capacitor 303 coupled to ground. Balancing network 38d creates an RLC balancing network comprising the capacitor 303, the resistor 301 and the isolation transformer 38c. The balancing network is used to balance the impedance of the telephone line interface with the impedance of the telephone line.

Telephone line interface 38 further comprises the audio path 38e which is coupled to the isolation transformer 38c. Audio path 38e is coupled to ground through a resistor 305 and a capacitor 307. The audio signal transmitted from isolation transformer 38c passes through a capacitor 309 and a resistor 311 before being input into an audio buffer 38f. Audio buffer 38f comprises an op amp 313 coupled to a resistor 315 and a capacitor 317 as shown in FIG. 6c. Op amp 313 is coupled to a +2.5 voltage source. The output of audio buffer 38f is the RXAUDIO signal which is transmitted to the modem 30 shown on FIG. 6a and the Intellistar transmit module 42 which will be described in conjunction with FIGS. 7a and 7b. The RXAUDIO signal is attenuated when the TONEOUT signal is active. The TONEOUT signal is transmitted from the DTMF generator 36 shown on FIG. 6a. The TONEOUT signal passes through a resistor 323 and activates a transistor 321 which is connected to ground and the RXAUDIO signal through a capacitor 319. After the RXAUDIO signal has passed through capacitor 319, the signal is transmitted to call status detector 28.

Also shown on FIG. 6c is the incoming ring detector 37. Incoming ring detector 37 comprises a comparator 310 which has a first input coupled to the RING input of the telephone through a resistor 316, a capacitor 316 and a capacitor 318. The first input of comparator 310 is connected to a +5 volt supply through a resistor 320 and is coupled to ground through a resistor 324. A second input of comparator 310 is coupled to the TIP input through a resistor 314 and a capacitor 312. The second input of comparator 310 is coupled to ground through a resistor 322. The output of the comparator 310 passes through a diode 332 and is coupled to a +5 volt supply through the parallel connection of a diode 328 and a resistor 326. The output of diode 332 generates the inverse RING signal which is coupled to ground through a capacitor 330. The inverse RING signal is transmitted to programmable I/O 10h to inform microprocessor control system 10 that a ringing signal has been detected on the telephone line.

Figure 7B:
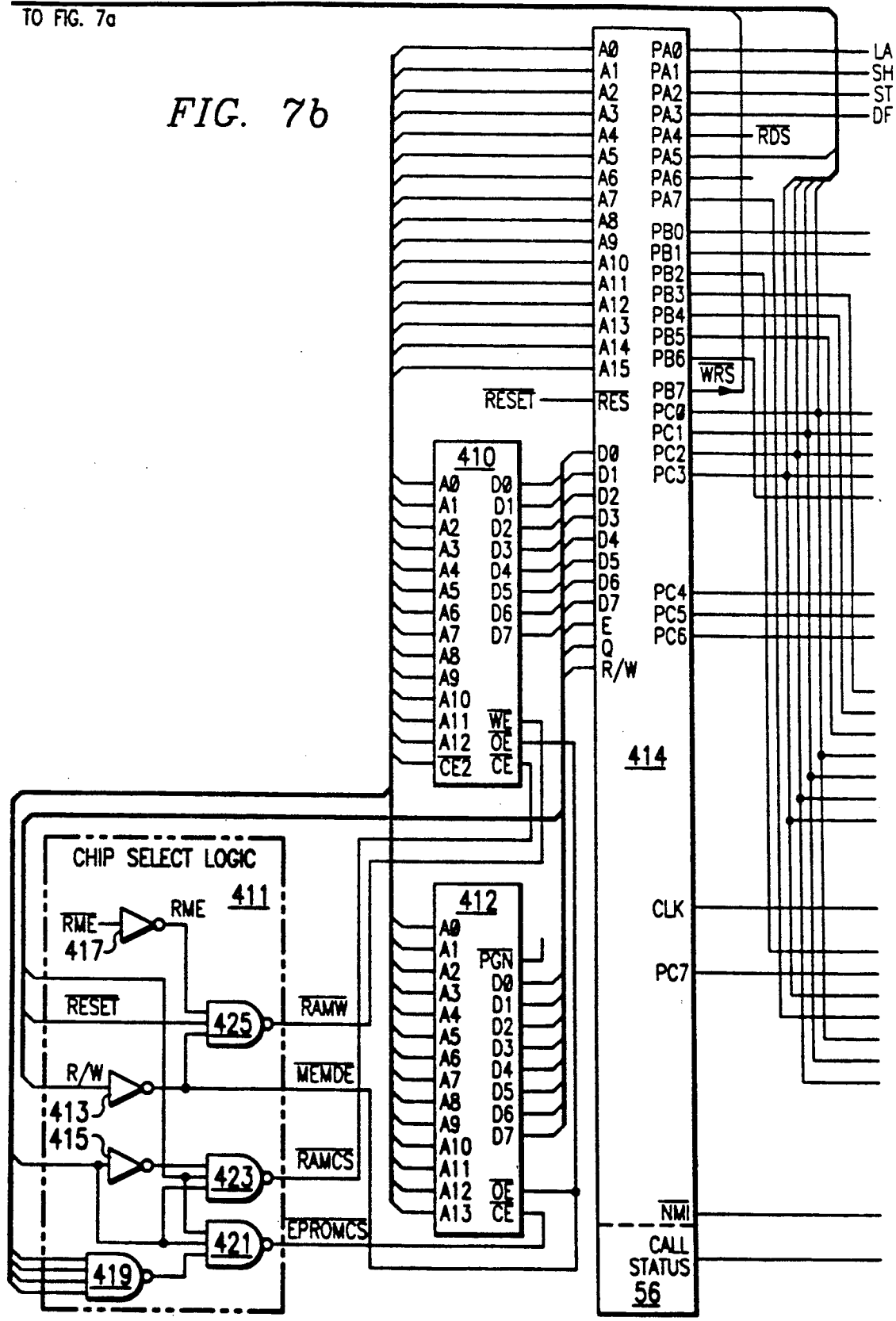

FIG. 7a is a schematic representation of the components of the Intellistar receive module 42, the Intellistar system controller 48 and the Intellistar transmit module 40. Generally, the components shown in FIGS. 7a, 7b and 7c serve as a slave microcomputer control system which is operationally peripheral to the telephone terminal. Referring to FIG. 7a, a speech synthesizer 400 is shown which may comprise, for example, a Toshiba TC 8830 speech synthesizer chip. Speech synthesizer 400 stores speech messages in digital memory and is capable of recording and playing back these messages. Speech synthesizer 400 uses three RAM chips 402, 404 and 406. RAM chips 402, 404 and 406 may comprise for example, Hitachi 62256 low power 32K×8 RAMs. RAMs 402, 404 and 406 interface with speech synthesizer 400 through address bus A0–A14 and data bus D0–D7. RAM chips 402, 404 and 406 are powered by the VBAT battery backed power signal. The speech synthesizer 400 selects a specific RAM chip using the inverse CE1, inverse CE2 or inverse CE3 signals.

The speech synthesizer 400 is controlled by the Intellistar system controller 48 through the P0-P3 bus. The Intellistar system controller 48 comprises a microprocessor 414 which will be discussed in conjunction with FIG. 7b. In addition to the P0–P3 bus, microprocessor 414 also transmits to speech synthesizer 400 the inverse RD signal, the inverse ACL signal and the inverse WRSP signal. The inverse RD signal is a read enable control signal. The inverse ACL signal is a control signal which resets the speech synthesizer. The inverse WRSP signal is an additional read/write control signal generated by microcomputer 414. The MICIN signal is transmitted from the mouth piece 32 and is input to the C1 pin of speech synthesizer 400 after passing through a resistor 401 and a capacitor 402. The MICIN signal is an audio signal transmitted from the microphone 32 which may be recorded.

The XIN and XOUT pins of speech synthesizer 400 are coupled to a crystal 403 and to ground through capacitors 405 and 407. The crystal 403 is used to generate a clock signal for speech synthesizer 400 and generate a signal through an inverter 409 to clock a latch 408. The latch 408 is coupled to a +5 volt power supply as shown in FIG. 7a, and is used to synchronize the inverse WRS signal from microcomputer 414 to the inverse WRSP signal transmitted to speech synthesizer 400. Speech synthesizer 400 also generates a SPOUT signal which is transmitted to a summer 58a shown on FIG. 7c.

Referring now to FIG. 7b, the microprocessor 414 is shown and may comprise, for example, a GTE 65SC151 microcontroller chip. The microcomputer 414 is coupled to the address bus A0-A15, and the data bus D0-D7. It also generates the control signals contained in the P0-P3 bus through its PC0-PC3 pins. The inverse RDS signal is transmitted to the inverse RD pin of speech synthesizer 400 from the PA5 pin of microcomputer 414. The microcomputer 414 generates controls signals LA, SH, ST and DF which are transmitted to components of the switch array 54 shown on FIG. 7c.

Microcomputer 414 is coupled to a RAM 410 which may comprise, for example, an 8K×8 static RAM. RAM 410 is used to store program memory and is coupled to the microcomputer 414 through the address bus A0-A12 and the data bus D0-D7.

An EPROM 412 is coupled to microcomputer 414 through address bus A0-A13 and data bus D0-D7. EPROM 412 may comprise, for example, a 16K×8 EPROM which is used to store the boot program for microcomputer 414.

The RAM 410 and the EPROM 412 are selected and enabled by an inverse RAMW signal, an inverse MEMOE signal, an inverse RAMCS signal and an inverse EPROMCS signal. These control signals are generated by chip select logic 411 shown on FIG. 7b. Chip select logic 411 comprises inverters 413, 415 and 417, and NAND gates 419, 421, 423 and 425, which are coupled as shown in FIG. 7b. Chip select logic 411 uses the E signal, the Q signal and the R/W signal generated by microcomputer 414 to enable RAM 410 and EPROM 412.

Microcomputer 414 also generates the inverse VWRB signal and the inverse VRDB signal from its PBO and PB1 pins respectively. The PB2 pin is coupled to the EXCLK pin of modem 30 shown on FIG. 7c. The PB3 through PB5 pins are coupled to a DTMF receiver 52 shown on FIG. 7c. The PB6 pin is used to enable a call status detector 50 shown on FIG. 7c. The PB7 pin generates the inverse WRS signal which is transmitted to the latch 408 shown on FIG. 7a. The PC0 through PC3 pins generate the P0 through P3 control bus which controls speech synthesizer 400 and call status detector 50. The PC4 pin transmits the inverse MINT signal to the programmable I/O 10h. The LA1 signal is received from gate array 10i on pin PC5 of microcomputer 414. The PC6 pin is used to generate the VDATA signal which is connected to the programmable I10 10h and gate array 10i. VDATA is a bidirectional data line for communication between the system processor and the Intellistar system processor. The CLK pin transmits a clock signal to the call status detector 50 and the DTMF receiver 52 shown on FIG. 7c. The PC7 pin is coupled to the DATA pin of modem 30 shown on FIG. 7c. The inverse of NMI is connected to the VCLK signals which is generated by the gate array 10j. Call status tone generator 56 is resident on microcomputer 414 and generates a signal from the CALL STATUS pin which is transmitted to summer 58a shown on FIG. 7c.

Figure 7C:
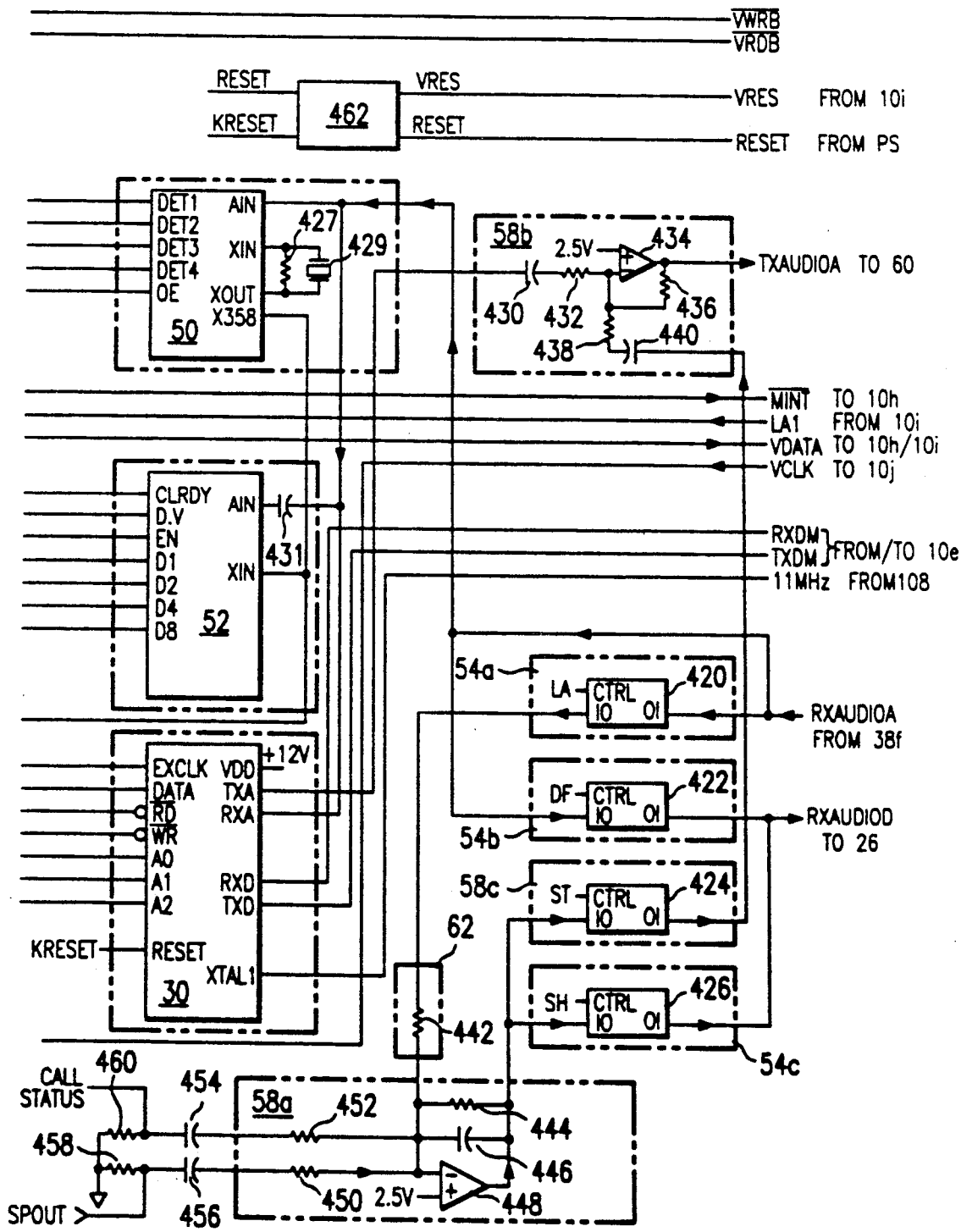

Referring now to FIG. 7c, call status detector 50 may comprise, for example, a Silicon Systems 75T982 call status detector chip. Call status detector 50 is used to detect specific frequencies such as a busy tone, dial tone, a ring tone, or other tones that are associated with the telephone line. Call status detector 50 is coupled to the RXAUDIOA signal which is received from telephone line interface 38f at the AIN pin. Call status detector 50 utilizes a parallel connection of a resistor 427 and a crystal 429 which are coupled to the XIN and XOUT pins. The crystal 429 oscillates at 3.58 megahertz and is used for timing functions within the call status detector 50. This time base is also used by microcomputer 414 and DTMF receiver 52. The call status detector 50 is coupled to the microcomputer 414 through its DET1, DET2, DET3, DET4 and OE pins.

The RXAUDIOA signal transmitted from telephone line interface 38 is also input into the DTMF receiver 52 shown on FIG. 7c. The RXAUDIO signal is input into the AIN pin through a capacitor 431. DTMF receiver 52 may comprise, for example, a Silicon Systems 75T202 DTMF receiver chip. DTMF receiver 52 detects the presence of DTMF signals in the RXAUDIOA signal. The DTMF receiver 52 is coupled to the microcomputer 414 through its CLRDY, DV, EN, D1, D2, D4, D8 and XIN pins.

The RXAUDIOA signal from the telephone line interface 38 is also transmitted to the RXA pin on modem 30. Modem 30 may comprise, for example, a 1200 band phase shift keyed Bell 212 protocol modem, such as a Silicon Systems 75T212. The TXDM and RXDM signals are used by modem 30 to communicate serial data to the gate array 10e. Modem 30 also receives an 11 megahertz clock signal from oscillator 108. Modem 30 transmits a signal from its TXA pin into a summer circuit 58b which forms a portion of the summer 58 shown on FIG. 2.

Modem 30 is coupled to microcomputer 414 shown on FIG. 7b through its EXCOK, DATA, inverse RD, inverse WR, A0, A1 and A2 pins. The RESET pin is coupled to a KRESET signal which is generated by a reset generator 462. The reset generator 462 shown on FIG. 7c may comprise for example a TI 7705 reset generator chip. The reset generator 462 is coupled to the RESET and VRES signals from the power supply and from gate array 10i respectively. Reset generator 462 generates the RESET signal and the KRESET signal used to reset the system.

The path of the RXAUDIOA audio signal originates from telephone line interface 38 and is used in several devices shown on FIG. 7c. The RXAUDIOA audio signal is first input into call status detector 50, which monitors the signal to detect various frequencies associated with the telephone line. The RXAUDIOA signal is also input into DTMF receiver 52 which is used to detect the presence of DTMF signals used for telephone dialing.

The RXAUDIOA signal is also input into a portion of switch array 54 indicated as 54a on FIG. 7c. Switch a comprises an analog switch 420 which is controlled by the LA control signal generated by microcomputer 414. If the analog switch 420 is closed, the RXAUDIOA signal will pass through the 20 dB attenuator 62 which comprises a resistor 442. The signal will then enter a portion of summer 58 labeled as 58a on FIG. 7c.

The RXAUDIOA signal is also input into a switch 54b which also forms a portion of switch 54. Switch 54b comprises an analog switch 422 which is controlled by the DF control signal generated by microcomputer 414. When analog switch 422 is closed, the RXAUDIOA signal is transmitted directly back to the controlled ear piece 26 as the RXAUDIOD signal which is shown entering analog switch 266 on FIG. 6b.

The summer 58a sums three separate signals. The first signal is the attenuated audio signal coming from 20 dB attenuator 62. The second input signal is from the call status tone generator 56 which is resident on microcomputer 414. This signal is labeled CALL STATUS on FIGS. 7b and 7c, and is connected to ground through resistor 460. The DTMF signal is transmitted through a capacitor 454 and a resistor 452 to a first input of an op amp 448. The op amp 448 is coupled in parallel to a capacitor 446 and a resistor 444. The final input signal to the summer 58a is the SPOUT signal generated by the speech synthesizer 400 shown on FIG. 7a. The SPOUT signal comprises the audio messages generated by the speech synthesizer 400. The SPOUT signal is coupled to ground through a resistor 458 and is transmitted to the first input of op amp 448 through a capacitor 456 and a resistor 450.

The output of op amp 448 is transmitted to switch 54c which forms a part of switch array 54. Switch 54c comprises an analog switch 426 which is controlled by the SH control signal generated by microcomputer 414. When switch 426 is closed, the summed audio signal from 58a is transmitted directly to the controlled ear piece 26 as the RXAUDIOD signal. The output of summer 58a is also transmitted to a switch 58c which comprises an analog switch 424 controlled by the ST control signal generated by microcomputer 414. When analog switch 424 is closed, the audio signal from summer 58a is transmitted to a second stage of summer 58 labeled 58b. Summer 58b operates to sum the audio signal from summer 58a and the transmitted signal from modem 30. The output of summer 58b is transmitted as TXAUDIOA signal to summer 60 shown on FIG. 6a. Summer 58b comprises an op amp 434 coupled to a +2.5 volt supply. Op amp 434 is coupled in parallel to a resistor 436. The signal from switch 58c is input into op amp 434 through a capacitor 440 and a resistor 438. The signal from modem 30 is input into op amp 434 through a capacitor 430 and a resistor 432.

Collect and Direct 0+ Calls

Aspects of the telephone system constructed in accordance with the present invention may be better understood in connection with a flow chart representation of the steps necessary to perform these functions. FIGS. 8a-g represent the decision making process carried out by microprocessor control system 10 in carrying out the EZ collect and direct 0+ call on a telephone constructed according to the present invention. Unless otherwise indicated, any decision made in the flow charts occurs in microprocessor control system 10.

Figure 8A:
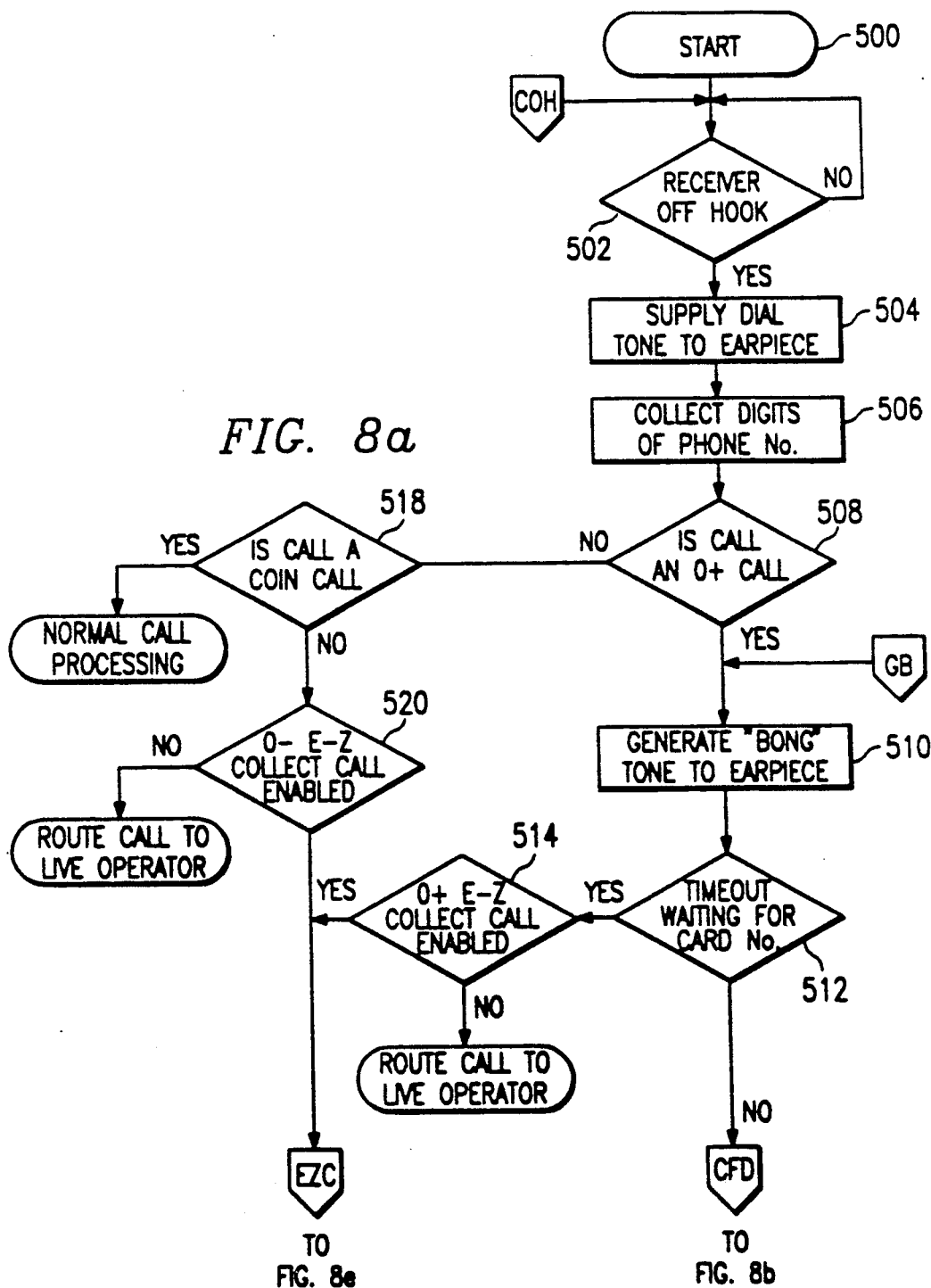
FIGS. 8a-8g are flow charts showing the process of placing a collect or 0+ call according to the present invention;.

FIG. 8a comprises the beginning series of flow chart steps for the EZ collect and direct 0+ telephone call conversion technique of the present invention. An important technical advantage of the present invention, is the ability of the local telephone station to take a call which is intended to be billed to a remote location and convert the call to a call format which is billed by the telecommunications system to the local telephone station. This enables the owner of the local terminal to bill for the call. For example, a patron may pace a collect call on the telephone. Ordinarily the collect call would be billed directly by the primary telephone company to the destination number, provided the call was accepted. According to the teaching of the present invention, however, the local telephone station changes the access format of the numbers input into the telecommunications network so that the local telephone station is billed for the call. In this manner, the owner of the local telephone station can bill for all types of calls placed from the station.

In the case of a collect call or a credit card phone call, the local telephone station receives the destination number and billing information and places the call in a 1+ format. In another aspect of the present invention, the telephone could place a call placed using a 950 exchange and also convert the call to a 1+ format. This type of access format is known as a feature group B access format. A telephone constructed according to the teachings of the present invention can similarly convert a call placed using a feature group D access format using a 10XXX prefix. The telephone of the present invention can also be programmed to convert calls placed using all forms of charge accounts from bank cards to gas cards. The telephone of the present invention can recognize and convert any similar call placement access formats and all such formats are intended to be included within the scope of the present invention. The actions of the telephone station described in conjunction with the EZ collect and credit card phone calls would be substantially identical for any call placement access format. Due to the great number of these possible access formats, only the exemplary EZ collect and credit card phone calls will be described in detail.

The program is initiated at 500 and a decision is made at 502 as to whether or not the receiver is off hook. If the answer is no, the program loops back and waits for the receiver to go off hook. The receiver off hook decision is made by the key pad hook switch 24.

If the receiver was off hook, the program flow turns the dial tone on to the earpiece at step 504. Step 504 is accomplished by the telephone line interface 38 providing an audio path to the earpiece 26. Program flow then goes to step 506 where microprocessor control system 10 collects the digits of the telephone number as the patron dials them on keypad 24. A decision is then made at step 508 based upon the digits collected in step 506 as to whether the call is a 0+ call, meaning that more digits were dialed after a 0. If more digits were dialed after the patron dialed a 0, the call is a 0+ call and the program flow proceeds to step 510 where the microprocessor control system 10 generates a "bong" tone to the earpiece 26.

Step 510 is accomplished by using a synthesized bong tone generated by speech record/playback generator 44 and transmitting this tone through an audio path through switch array 54 to earpiece 26. The bong tone would then be heard by the patron, queing him to enter a telephone credit card number if he so desires. Program flow then proceeds to step 512 where a decision is made based on whether or not the patron has entered a calling card. The program flow waits a predetermined amount of time for the patron to enter a credit card number and if he does, program flow proceeds to CFD which is shown on FIG. 8b.

At step 512, if the patron does not enter a telephone credit card number, program flow proceeds to step 514 where another decision is made where microprocessor control system 10 checks to see if the 0+ EZ collect call feature has been enabled in this particular telephone. This is done by microprocessor control system 10 testing an enable bit which is stored in rate memory 16. If the telephone is not enabled to place 0+ or EZ collect calls, program flow would route the call to a live operator. At step 514, if the telephone was enabled to accept 0+ EZ collect calls, program flow proceeds to EZC which is shown on FIG. 8e.

At decision block 508, if microprocessor control system 10 determines that the call was not a 0+ call, program flow would proceed to decision block 518 where microprocessor control system 10 would determine if the call was a coin call, meaning that the digits that were dialed were not 0+ but were a 1+ or direct dial call. If this is true, then program flow would proceed to normal call processing which was described earlier. At step 518, if the microprocessor system 10 decides that the call is not a coin call, the call is a 0− call. In this instance, program flow proceeds to step 520 where microprocessor control system 10 tests an enable bit contained in rate memory 16 to determine if the 0− EZ collect call feature of the telephone is enabled.

If this test bit indicates to microprocessor control system 10 that the feature is not enabled, program flow would proceed to route the call to a live operator. If the feature has been enabled in the telephone, program flow would proceed to place the call using the EZ collect feature. This is shown on the flow chart where program flow proceeds through EZC shown on FIG. 8e.

Figure 8B:
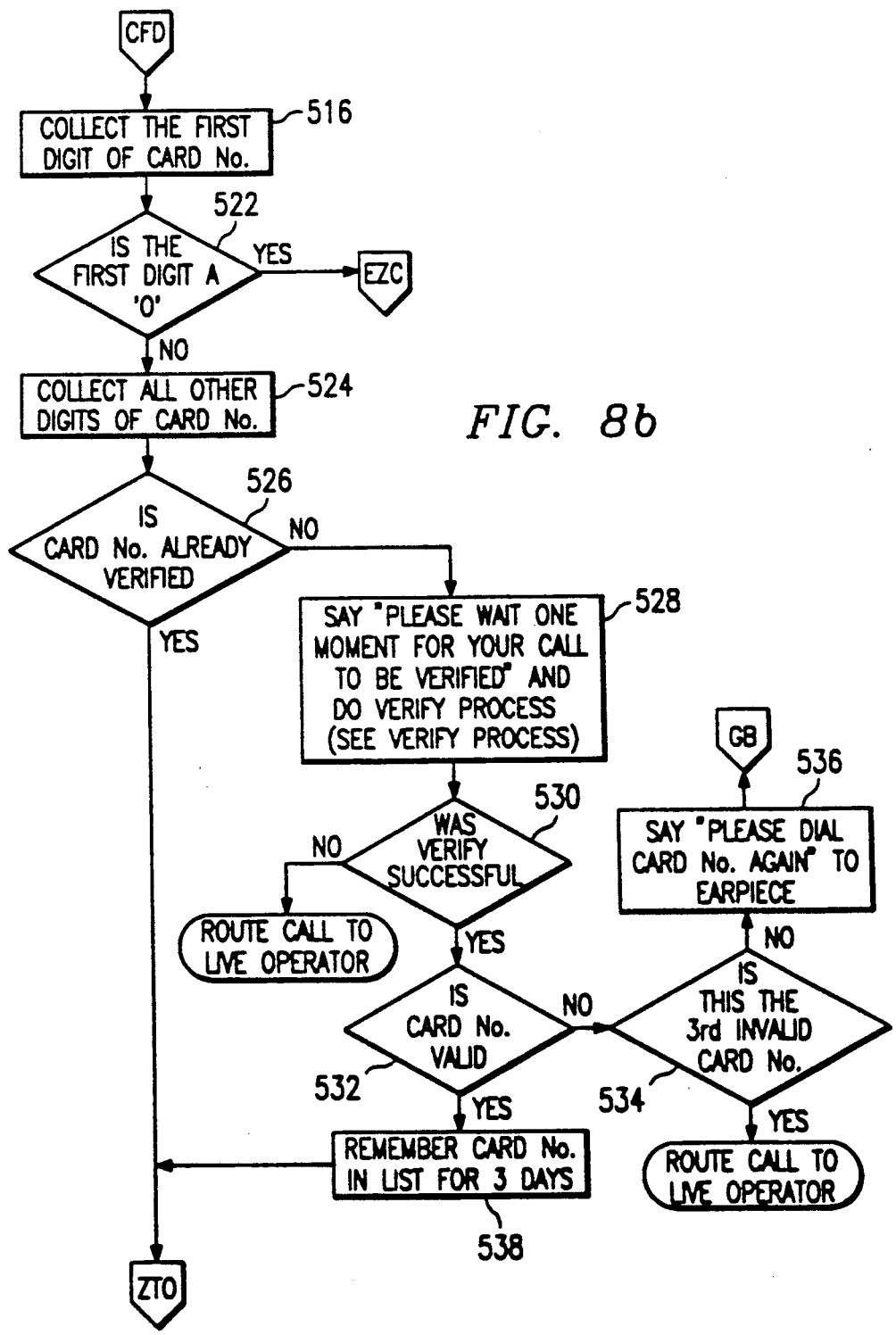

Referring now to FIG. 8b, program flow proceeds from CFD to step 516. At step 516, the first digit of the telephone credit card number is collected through keypad 24. Program flow then proceeds to decision block 522 where microprocessor control system 10 determines if the first digit collected was a zero. If the first digit was a zero, program flow proceeds to EZC which is shown on FIG. 8e. If the first digit of the telephone credit card number was not a zero, program flow proceeds to step 524 wherein microprocessor control system 10 collects the remaining digits of the telephone credit card number from keypad 24. The digits of the telephone credit card number are stored in stack RAM 46 contained within microprocessor control system 10.

Program flow then proceeds to decision block 526 wherein microprocessor control system 10 compares the digits of the telephone credit card number entered by the patron to a list of card numbers which have been verified in the recent past. If the card number has already been verified, microprocessor control system 10 will find it listed in the memory, and the program flow will proceed to ZTO which is continued on FIG. 8c.

An important technical advantage of a telephone constructed according to the teachings of the present invention is the telephone's ability to locally store billing numbers which have been validated. Because of this capability a user of a particular telephone station making multiple calls using the same billing number need not wait for the number to be revalidated. This capability greatly reduces the time necessary to process some calls and thereby greatly enhances the convenience of the telephone for users.

Referring again to FIG. 8b, if the card number has not recently been verified, program flow proceeds to step 528 wherein microprocessor control system 10 utilizes speech synthesizer 44 to play back a prerecorded speech message into earpiece 26 which instructs the patron to wait a predetermined time for his call to be verified. Step 528 also includes the verification process which is shown independently in flow chart form in FIG. 11. Program flow then proceeds to decision block 530 wherein microprocessor control system 10 tests a flag which was set during the verification process dependent on whether the card was able to be verified. If the verification was not successful, the call would then be routed to a live operator who could attempt to verify the card.

If the verification was successful, program flow proceeds to step 532 where microprocessor control system 10 determines whether the verification process determined that the card number was valid. If the card was not valid, program flow proceeds to decision block 534 wherein microprocessor control system 10 tests a counter in its stack RAM to determine if this is the third invalid card number entered by this patron. If this is the first or second invalid card number entered by the patron, program flow proceeds to block 536 wherein microprocessor control system 10 utilizes speech synthesizer 44 and speech memory 46 to enunciate an audio message into earpiece 26 to ask the patron to enter a card number again. Program flow then proceeds to GB which reenters program flow on FIG. 8a prior to block 510. If at decision block 534, microprocessor control system 10 determines that this is the third invalid card number entered by this patron, the call would be routed to a live operator.

If at decision block 532, microprocessor control system 10 determines that the verification process determined the card number was valid, program flow proceeds to block 538 wherein the card number is stored in RAM memory contained within microprocessor control system 10. This list of valid card numbers is updated in order to reduce the number of validation accesses that the telephone must attempt. The card numbers contained in this memory are held for a period of three days in order to allow a patron to place multiple telephone calls using the same card number within a short period of time more quickly and more conveniently. After the card number is placed in memory, program flow proceeds to ZTO which is continued on FIG. 8c.

Figure 8C:
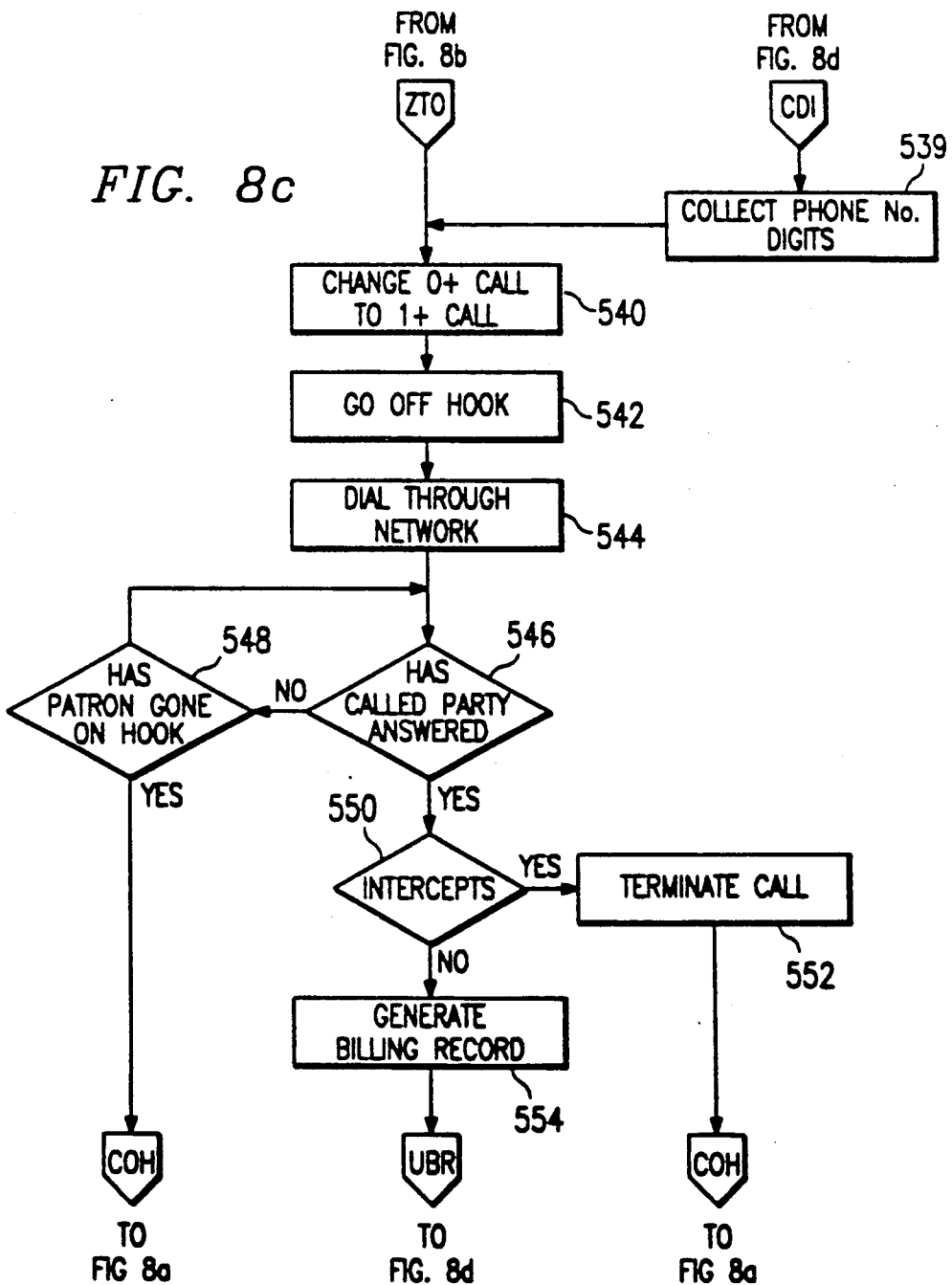

Referring now to FIG. 8c, program flow proceeds from ZTO which flows from steps 526 and 538 on FIG. 8b. Program flow proceeds to branch ZTO only if the card number has been verified. Program flow then proceeds to block 540 wherein microprocessor control system 10 uses information stored within its own RAM and information stored in rate memory 16 to turn the 0 plus number into a 1 plus number. Program flow then proceeds to block 542 wherein microprocessor control system 10 uses telephone line interface 38 to take the telephone line off hook and draw central office loop current. Program flow then proceeds to block 544 wherein microprocessor control system 10 dials the number through the telephone line interface 38 by using DTMF generator 36.

Program flow then enters a loop formed by decision blocks 546 and 548. In decision block 546, microprocessor control system 10 uses the call status detector 28 and call status detector 50 to detect whether the called party has answered. If the called party has not answered, program flow proceeds to decision block 548 where microprocessor control system 10 determines if the patron has gone on hook by polling the keypad and hook switch 24. If the patron has gone on hook, program flow proceeds to branch point COH which reenters program flow on FIG. 8a. If the patron has not hung up the telephone, program flow stays in this loop until either the party has answered in decision block 546 or the patron has gone on hook in decision block 548.

When the called party answers at decision block 546, program flow proceeds to decision block 550 wherein microprocessor control system 10 looks for intercept signals through the call status detector 28. If such intercept signals are detected, program flow proceeds to block 552 wherein microprocessor control system 10 takes the telephone line interface 38 back on hook, terminating the call. Program flow then proceeds to branch point COH which reenters program flow on FIG. 8a.

If in decision block 550, microprocessor control system 10 did not detect any intercept signals, program flow proceeds to block 554 wherein microprocessor control system 10 generates a billing record which is stored in call record memory 11. Program flow then proceeds to branch point UBR which is continued on FIG. 8d.

Figure 8D:
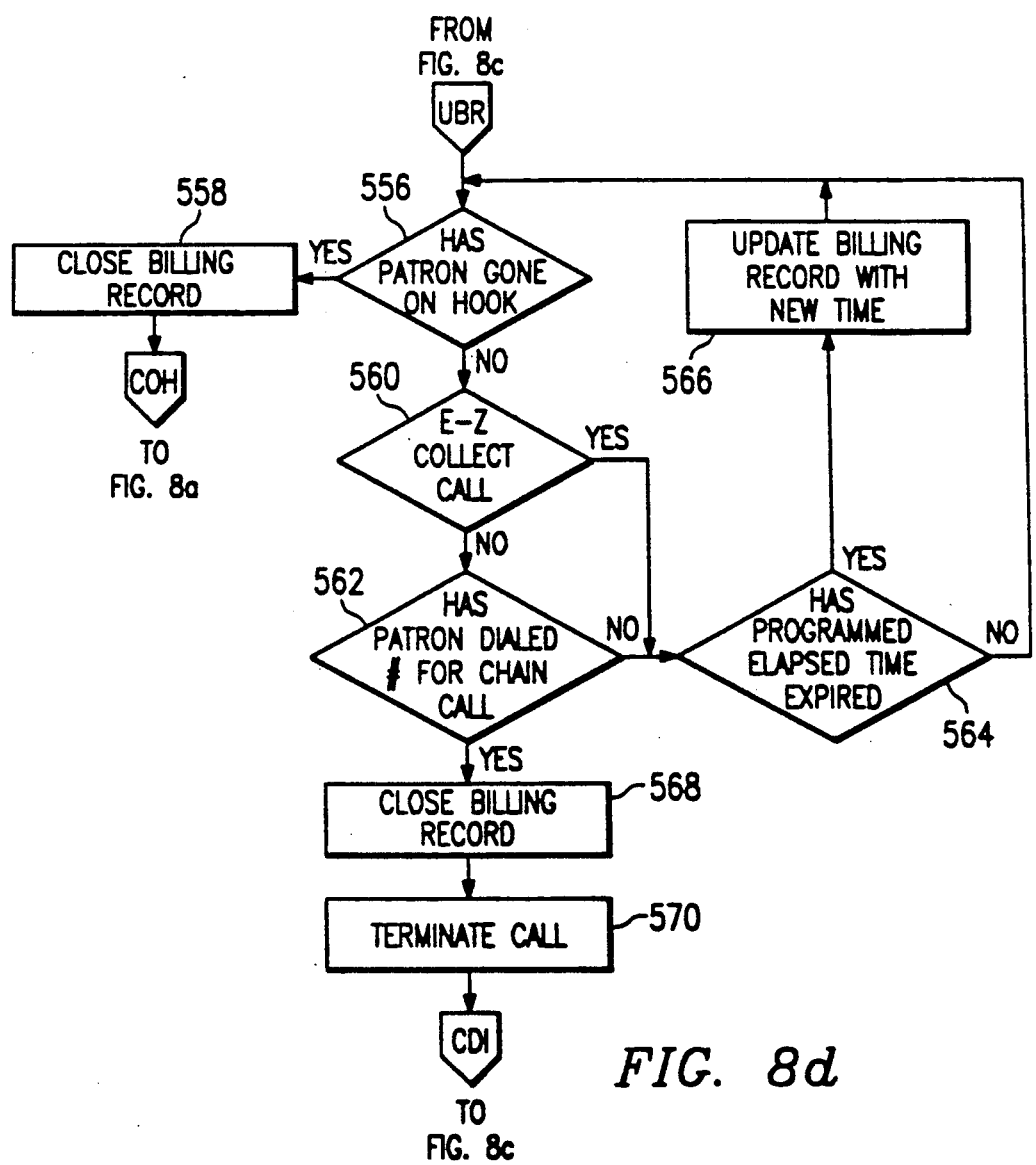

Also shown on FIG. 8c is branch point CDI which is reentering program flow from FIG. 8d. Program flow proceeds from CDI to block 539 wherein microprocessor control system 10 collects the digits of the telephone number dialed by patron on keypad 24. Referring to FIG. 8d, program flow proceeds from branch point UBR to decision block 556, wherein microprocessor control system 10 polls hookswitch 24 to determine if the patron has gone on hook. If the patron has gone on hook, program flow proceeds to block 558 which closes the billing record and then proceeds to branch point COH which reenters the program flow on FIG. 8a.

If at decision block 556, the patron had not gone on hook, the program flow proceeds to decision block 560 where microprocessor control system 10 decides whether the call is an EZ collect call. If the call is not an EZ collect call, program flow proceeds to block 562 wherein microprocessor control system 10 checks keypad 24 to determine if the patron has dialed a number sign for a chain call. This is a common method for a patron to place another call using the same card number without having to go back on hook and redialing the card number.

If at decision block 560 the call was an EZ collect call, or if at decision block 562 the patron had not dialed a number sign for a chain call, program flow proceeds to decision block 564 which determines if the programmed elapse time has expired. The programmed elapse time is determined by microprocessor control system 10 by using an internal clock and rate memory 16 for a particular call. If the programmed elapse time has expired, program flow proceeds to block 566 which updates the billing record in call record memory 11 and records the new time. Program flow then proceeds back to decision block 556. If at decision block 564, the programmed elapse time had not expired, program flow would proceed directly to decision block 556.

If at decision 562 the patron had dialed a number sign indicating a chain call, program flow would proceed to block 568 wherein microprocessor control system 10 would close the billing record stored in call record memory 11. Program flow would then proceed to block 570 wherein microprocessor control system 10 would terminate the call using telephone line interface 38. Program flow then proceeds to branch point CDI whereby program flow returns to FIG. 8c.

Figure 8E:
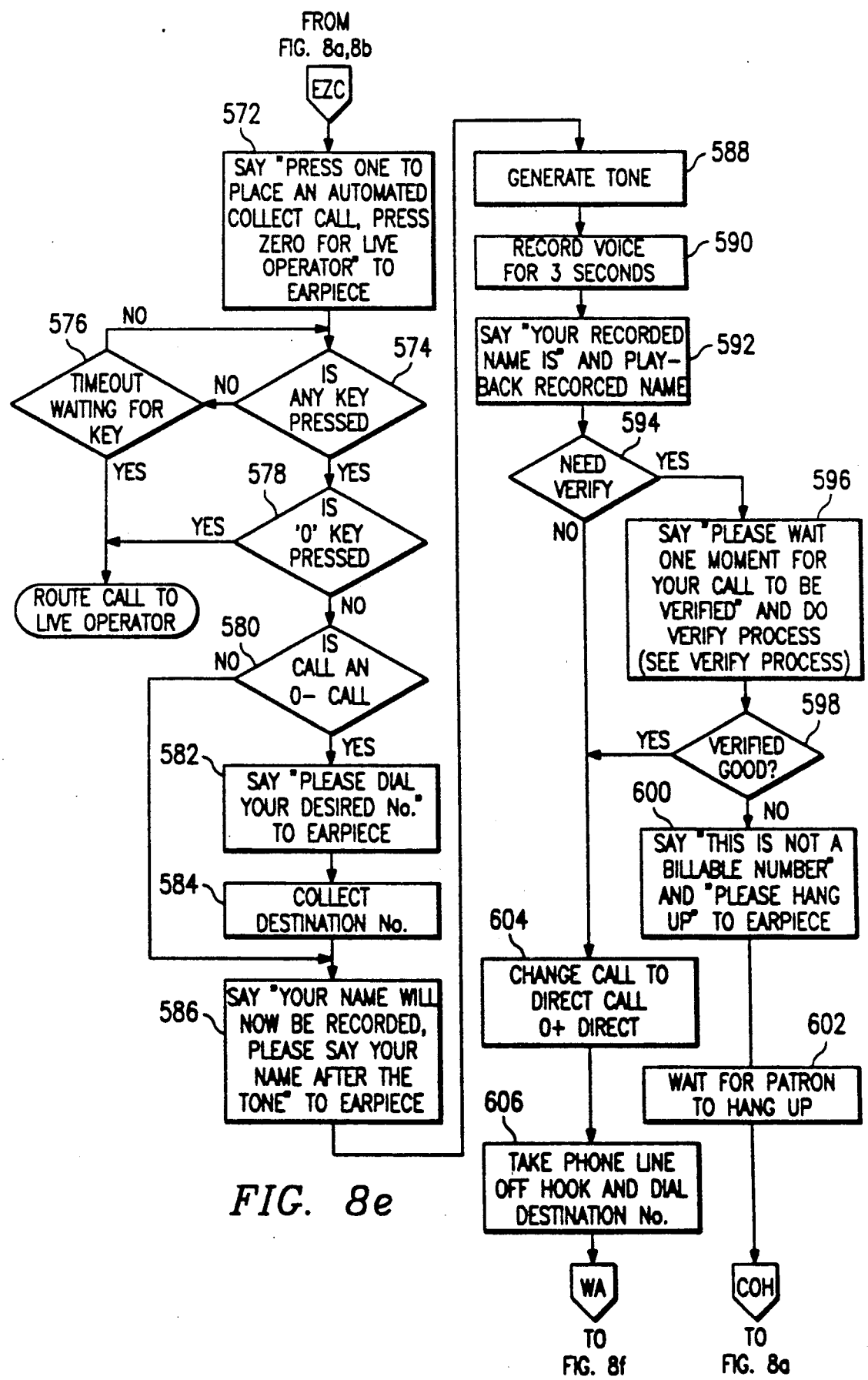

Referring now to FIG. 8e, branch point EZC, program flow proceeds from blocks 520 and 514 on FIG. 8a and from block 522 FIG. 8b. In this program branch, the patron was attempting either a 0− collect call or a 0+ EZ collect call. Program flow proceeds from branch point EZC to block 572 wherein microprocessor control system 10 utilizes speech synthesizer 44 to enunciate a prerecorded digitized message that instructs the patron to press the digit one on keypad 24 to place an automated collect call or to press the digit zero for a live operator. This prerecorded message is stored in speech memory 46 and is routed to earpiece 26 by microprocessor control system 10 through switch array 54.

Program flow then proceeds to decision block 574 wherein microprocessor control system 10 utilizes keypad 24 to determine if any key was pressed by the patron. If no key was pressed, program flow proceeds to decision block 576 wherein microprocessor control system 10 determines if too much time has elapsed between the enunciation of the message in block 572 and the key being pressed by the patron. If too much time has elapsed, program flow proceeds to route the call to a live operator. If too much has not yet elapsed, program flow proceeds back to decision block 574 to again check to see if a check has been pressed in keypad 24.

Once the patron depresses a key in keypad 24, program flow proceeds to block 578 wherein microprocessor control system 10 determines if the key pressed was a zero. If the key depressed was a zero, program flow proceeds to once again route the call to a live operator. If the key depressed was something other than zero, program flow proceeds to decision block 580 which determines if the original call that was placed and stored in memory in microprocessor control system 10 was a 0− call, meaning that no additional digits after the zero were dialed. If the call was a 0− call, then program flow proceeds to block 582 wherein microprocessor control system 10 again using speech synthesizer 44 and switch array 54 enunciates a message stored in speech memory 46 into earpiece 26 which requests the patron to dial his desired number.

Program flow then proceeds to block 584 where microprocessor control system 10 collects the digits of the destination number from keypad 24. If the original call placed was not a 0− call or after the destination number is collected in block 584, program flow proceeds to block 586 where the microprocessor control system again uses the speech record/playback generator 44 and speech memory 46 to enunciate through these audio switch array 54 into the earpiece 26 a phrase similar to "your name will now be recorded, please say your name after the tone." Program flow then proceeds to block 588 wherein microprocessor control system 10 uses speech synthesizer 400 to generate a single tone into the earpiece 26 to alert the patron that his name is to be recorded.

Program flow then proceeds to block 590 wherein the microprocessor control system 10 uses the speech record/playback generator 44 to record from the mouthpiece 32 and digitize the audio signal coming from the mouthpiece 32 into the speech memory RAM 46. This recording process is done for three seconds. Program flow then proceeds to block 592 wherein microprocessor control system 10 instructs the speech record/playback generator 44 to enunciate a phrase similar to "your recorded name is" and playback the freshly recorded name of the patron through audio switch array 54 into your piece 26. In an alternate embodiment of the present invention, the user's name is not recorded but merely transmitted directly to the called party after a temporary audio path is established.

Program flow then proceeds to decision block 594 wherein microprocessor control system 10 tests an enable flag stored in rate memory 16 to see if the verification process has been enabled by the user. If the verification process has been enabled, program flow proceeds to block 596 wherein the microprocessor control system 10 uses the speech synthesizer 44 in conjunction with speech memory 46 to enunciate a message similar to "please wait one moment for your call to be verified."

Figure 11:
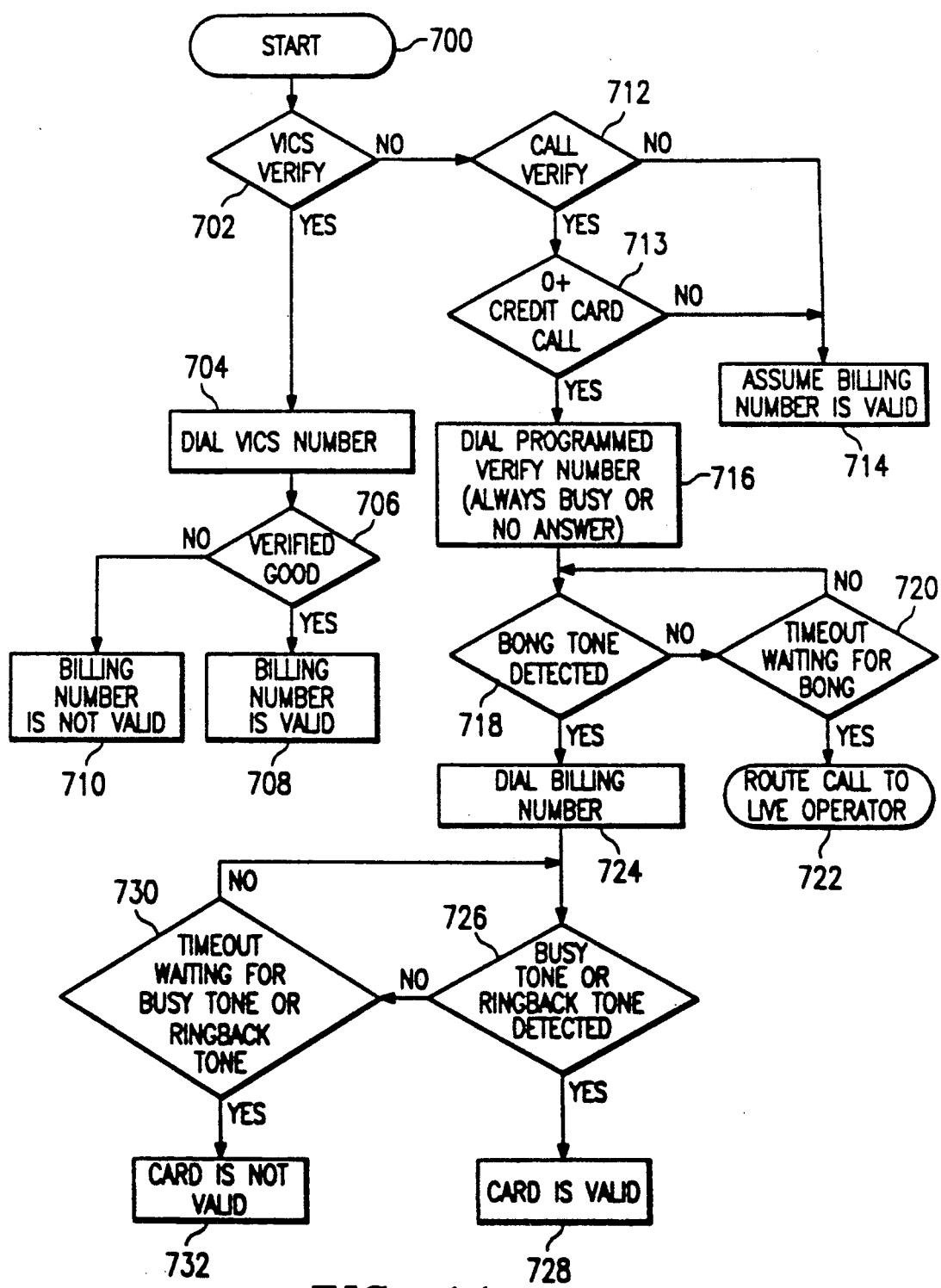
FIG. 11 is a flow chart showing the process used for verification of telephone billing account numbers used in the present invention.

Block 596 also includes the verification process illustrated in flow chart form in FIG. 11. Program flow then proceeds to decision block 598 where microprocessor control system 10 tests to see if the verification was good or bad. If the verification was not good, program flow proceeds to block 600 where the microprocessor control system 10 using the speech generator 34 enunciates a message into the earpiece 26 such as "this is not a billable number" and instructs the patron to "please hang up." Program flow then proceeds to block 602 wherein the microprocessor control system 10 waits for the patron to hang up. Once the patron has hung up, the program flow proceeds to branch point COH which reenters the program flow on FIG. 8a. If at decision block 594 the verification process was not enabled, or if at decision block 598 the verification process was determined by the microprocessor control system 10 to have been successful, program flow proceeds to block 604 wherein microprocessor control system 10 uses algorithms contained in program RAM to change the 0+ or 0− call into a direct dial call.

Program flow then proceeds to block 606 wherein microprocessor control system 10 using telephone line interface 38 takes the line off hook and using DTMF generator 36 dials the destination number. Program flow then proceeds to branch point WA which is continued on FIG. 8f.

Figure 8F:
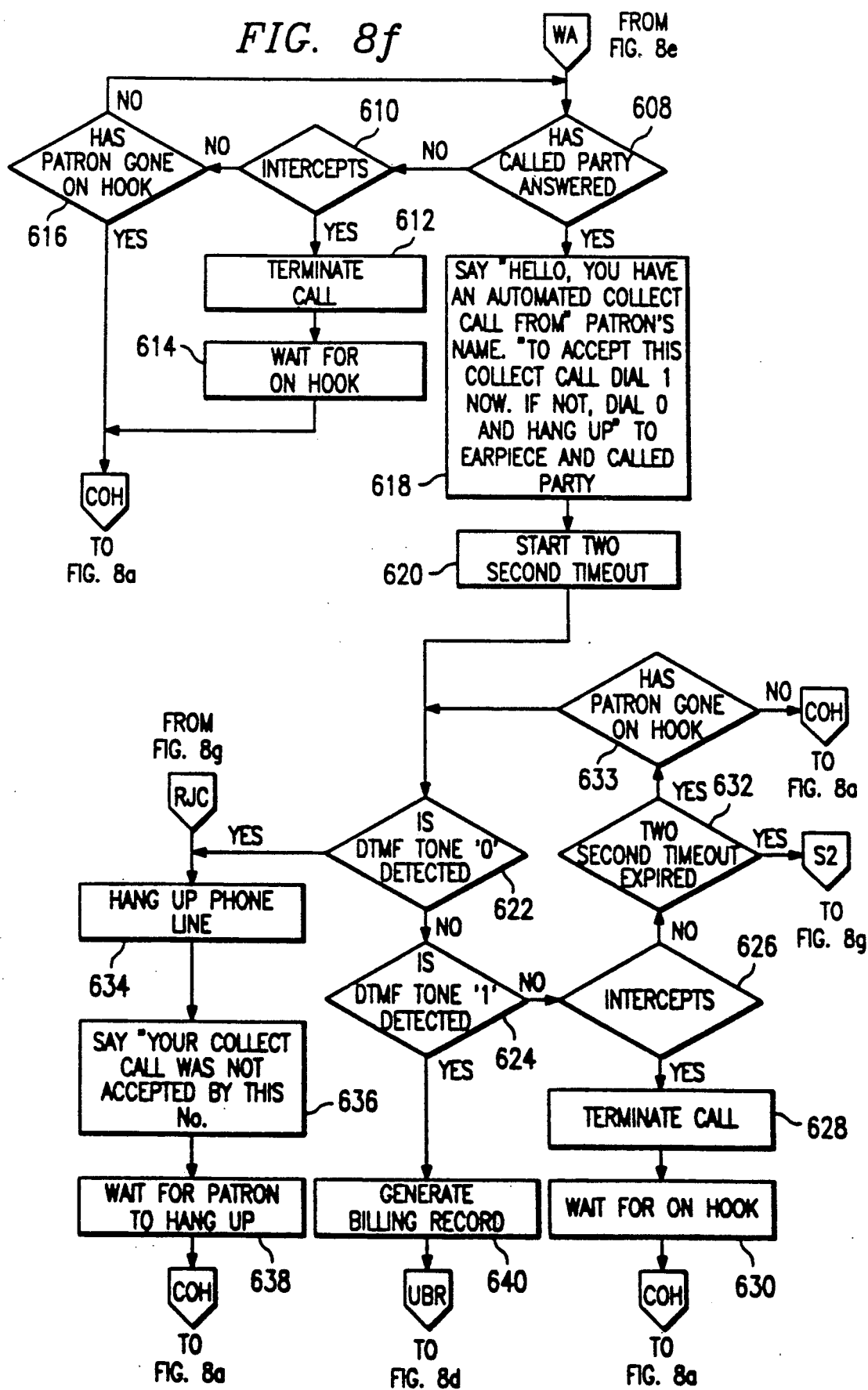

Referring now to FIG. 8f, program flow proceeds from block 606 to branch point WA and on to decision block 608. At decision block 608, microprocessor control system 10 uses call status detector 28 and call status detector 50 to determine if the call party has answered. If no answer has occurred, program flow proceeds to block 610 wherein microprocessor control system 10 again utilizes call status detector 28 and to detect if any intercepts have occurred. If intercepts have occurred, program flow proceeds to block 612 which terminates the call. Program flow then proceeds to block 614 wherein microprocessor control system 10 polls hook switch 24 and waits for the patron to hang up the telephone. When the patron hangs up the telephone, program flow proceeds to branch point COH which reenters the program flow on FIG. 8a. If at decision block 610 no intercepts have been detected, program flow proceeds to decision block 616 wherein microprocessor control system 10 once again polls hookswitch 24 to determine if the patron has gone on hook. If the patron has gone on hook, program flow proceeds to branch point COH and reenters the program on FIG. 8a. If at decision point 616 the patron has not gone on hook, program flow loops back to decision back 608 to once again test to see if the called party has answered.

When at decision point 608 the called party answers, program flow proceeds to block 618 wherein microprocessor control system 10 using speech synthesizer 44 and speech RAM 46 enunciates a message to ear piece 26 and down the telephone line through telephone line interface 38. This message tells the called party that he has a collect call, enunciates the patron's name, and instructs the called party to dial one if he wishes to accept the collect call or dial zero and hang up if he does not wish to accept the collect call. The message contained in block 618 on FIG. 8f is only an example of what might possibly be enunciated to the called party. An alternate message could move the replay of the patron's name to the very beginning of the message to prevent the called party from hanging up as soon as he hears a computer on the other end of the line.

Program flow then proceeds to block 620 wherein microprocessor control system 10 initiates a two-second waiting sequence. Program flow proceeds then to decision block 622 wherein microprocessor control system 10 uses DTMF receiver 52 to determine if a DTMF 0 has been detected. If a DTMF 0 was not detected, program flow proceeds to block 624 wherein microprocessor control system 10 again uses the DTMF receiver 52 to determine if a DTMF 1 has been detected. If no DTMF 1 has been detected, program flow proceeds to decision block 626 wherein microprocessor control system 10 utilizes call status detector 28 to determine if any intercept signals have been detected. If an intercept is detected in decision block 626, program flow proceeds to block 628 where microprocessor control system uses telephone line interface 38 to terminate the call. Program flow then proceeds to block 630 where microprocessor control system 10 pulls hookswitch 24 to wait for the patron to hang up the telephone. Once the patron has hung up the telephone, program flow proceeds to branch point COH and program flow reenters the flow chart on FIG. 8a.

If, at decision point 626, no intercept signals have been detected, program flow would proceed to decision block 632 wherein microprocessor control system 10 would determine if the two second waiting period had elapsed. If two seconds had expired, program flow proceeds to branch point S2 which is continued on FIG. 8g. If at decision block 632, the two second waiting period had not expired, program flow would proceed to decision block 633, where microprocessor control system 10 would check to see if the patron or the called party has hung up the phone. If neither party has hung up, program flow returns to decision block 622 where the microprocessor 10 once again tests for the detection of a DTMF 1 or a DTMF 0 tone.

In decision block 622, if the microprocessor control system utilizing the DTMF receiver 52 detects a DTMF 0, program flow proceeds to block 634 wherein microprocessor control system 10 utilizes telephone line interface 38 to disconnect the telephone line. Program flow then proceeds to block 636 where microprocessor control system 10 utilizes speech synthesizer 44 and speech RAM 46 to enunciate a message to the patron informing him that his collect call was not accepted. Program flow then proceeds to block 638 wherein microprocessor control system 10 pulls hookswitch 24 and waits until the patron hangs up. Program flow then proceeds to branch point COH and reenters the flow chart on FIG. 8a.

In decision block 624, if a DTMF 1 tone was detected, program flow proceeds to block 640, wherein microprocessor control system 10 initiates a billing record in call record memory 11. This billing record is marked to indicate that this call is an EZ collect call and not a 0+ telephone call. Program flow then proceeds to branch point UBR which reenters the flow chart on FIG. 8d.

Figures 8G, 9:
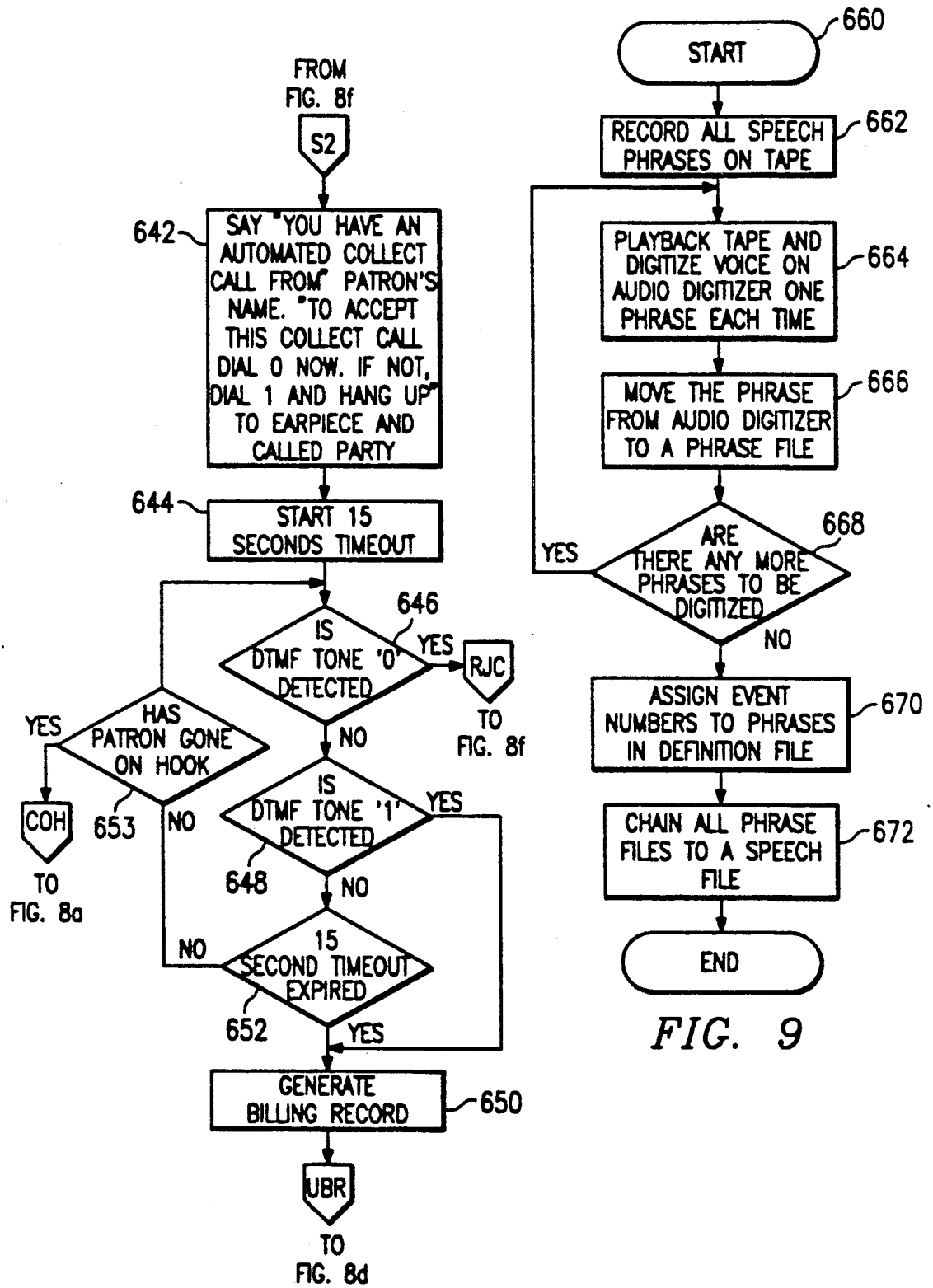
FIG. 9 is a flow chart showing the process of speech file generation used in the present invention.

Referring now to FIG. 8g, program flow proceeds from decision block 632 to branch point S2 after the two second waiting period has expired. Program flow then proceeds to block 642 wherein microprocessor control system 10 again uses the speech synthesizer 44 and speech memory RAM 46 to replay a message to the called party. The message indicates that the called party has an automated collect call from the patron and to instruct the called party that he must dial a one to accept the call or to dial a zero and hang up if he does not wish to accept the call.

Program flow then proceeds to block 644 wherein microprocessor control system 10 initiates a fifteen second waiting period. Program flow then proceeds to decision block 646 wherein microprocessor control system 10 utilizes DTMF receiver 52 to determine if a DTMF 0 has been detected. If a DTMF 0 is detected, program flow proceeds to branch point RJC which reenters the program on FIG. 8f at block 634. If at decision block 646 no DTMF 0 is detected, program flow proceeds to decision block 648 wherein microprocessor control system 10 once again utilizes DTMF receiver 52 to determine if a DTMF 1 has been detected. If no DTMF 1 tone has been detected at decision block 648, program flow proceeds to decision block 652 wherein microprocessor control system 10 determines if the fifteen second waiting period has expired. If the fifteen second waiting period has not expired, program flow proceeds to decision block 653 where microprocessor control system 10 again checks to see if either party has hung up the phone. If neither party has hung up the phone, program flow returns to decision block 646 where microprocessor control system 10 once again determines if either a DTMF 0 has been detected or a DTMF 1 has been detected. If at decision block 648 a DTMF 1 was detected, or if at decision block 652, the fifteen second waiting period expires, program flow proceeds to block 650 wherein microprocessor control system 10 generates a billing record in call record memory 11. Program flow then proceeds to branch point UBR which reenters the flow chart on FIG. 8d.

Under the method illustrated by FIG. 8g, if a called party fails to take any action and the fifteen second waiting period expires, the called party is deemed to have accepted the call. The reason for doing this is the existence of many rotary telephones that DTMF receiver 52 cannot detect.

An alternate embodiment of the present invention uses a voice recognition system to detect if the called party has accepted the call. A further embodiment of the present invention merely waits a specified period of time before completing the call. If the called party does not hang up within this period of time, he is assumed to have accepted the call. These and other similar methods of detecting the acceptance of the call by the called party are intended to be included within the scope of the present invention.

Speech File Generation

FIG. 9 represents in flow chart form the speech file generation process which is represented in block diagram form in FIG. 3. The process flow starts at block 660 and proceeds to block 662 wherein a speaker uses a tape recorder 70 shown in FIG. 3 to record all the appropriate phrases necessary on tape. Process flow then proceeds to block 664 where the tape recorder 70 plays back one phrase at a time into the audio digitizer 72. Process flow then proceeds to block 666 where the phrase is moved from the audio digitizer to a phrase file. Process flow then proceeds to decision block 668 which determines if there are many more phrases to be digitized.

If at decision 668 there are more phrases to be digitized, process flow loops back to block 664 and digitizes the next phrase. If there are no more phrases to be digitized at block 668, process flow proceeds to block 670 wherein the operator of the system using host computer 76 assigns event numbers to the phrases in a definition file. The event numbers provide a mapping system for the telephone to tell which phrases are used in which event in the telephone. Process flow then proceeds to block 672 wherein the user of the host computer 76 utilizing a program developed by Intellical takes all of the individual phrase files and combines them into one speech file with a directory at the beginning of the speech file to indicate where each of the phrases start and what its event mapping number is. Process flow then ends with the resulting product being a complete speech file on disk ready to be downloaded into a particular telephone.

Speech File Downloading

Figure 10:
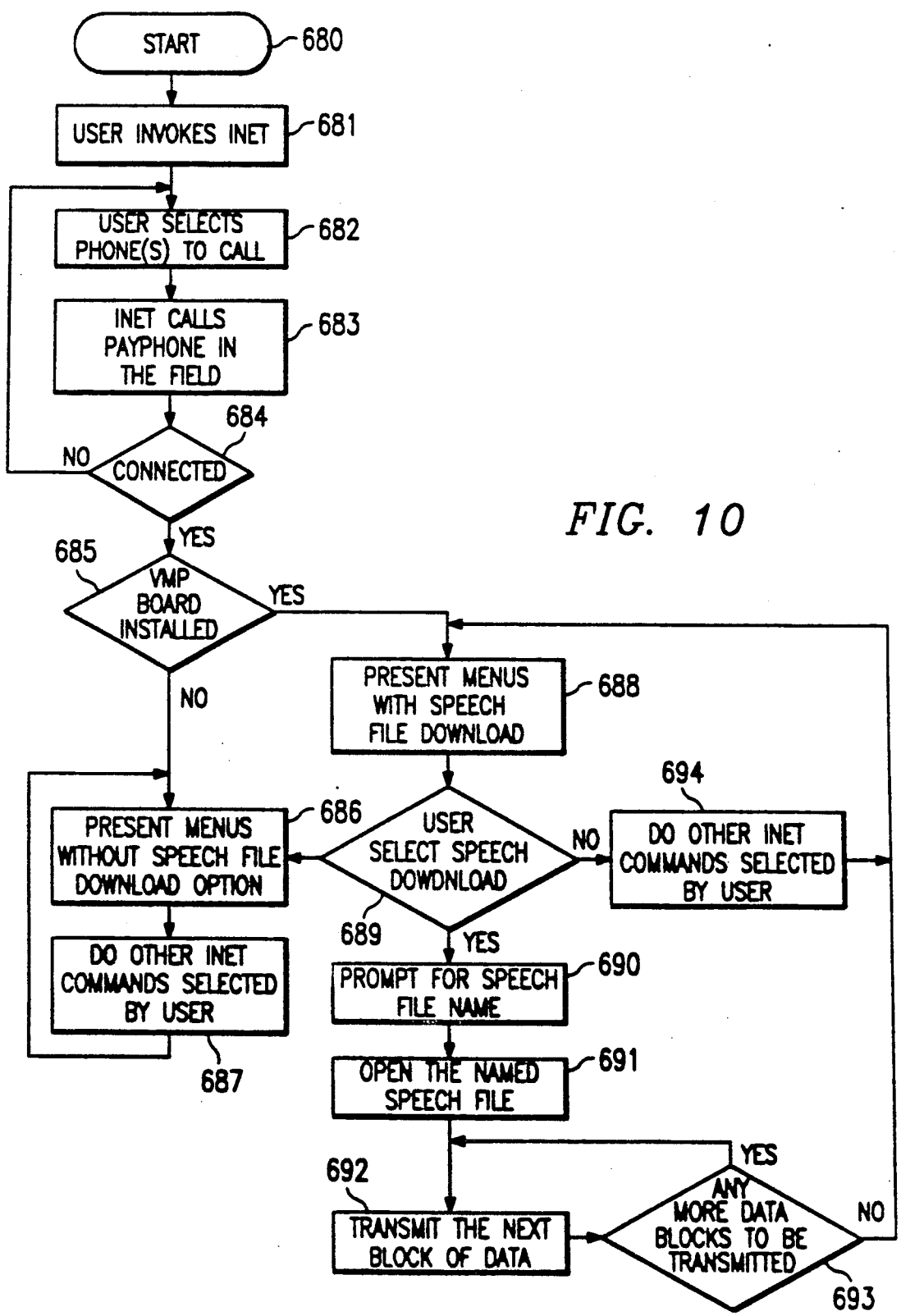
FIG. 10 is a flow chart showing the process for downloading speech files used in the present invention.

FIG. 10 illustrates in flow chart form the process by which the speech files that were generated in the process illustrated in FIG. 9 are downloaded into telephones in the field. Process flow starts at 680 and proceeds to block 681 wherein the user invokes a program developed by Intellical called INET on a host computer 76. The host computer 76 used in FIG. 10 may or may not be the same computer utilized to generate the speech files. Once the speech files have been loaded on to a diskette, the diskette may be transferred to any compatible computer to complete the downloading process into the telephones in the field.

Process flow proceeds to block 682 where through the host computer 76 the user selects a telephone or telephones to call. Process flow then proceeds to 683 wherein the INET software calls the pay telephone in the field. Process flow proceeds then to decision block 684 where the host computer determines if a connection has been made with the telephone in the field. If no connection is made, process flow loops back to block 682 where either the user manually selects another telephone to call, or if the original selection was for batch mode, the program would automatically proceed to the next telephoned call.

If at decision block 684 the connection was successfully made, process flow would proceed to block 685 wherein the host computer 76 determines if the particular telephone which has been called has a VMP board installed. The VMP board comprises Intellistar transmit module 40, Intellistar receive model 42 and Intellistar system controller 48 shown in FIG. 1. If the host computer 76 determines that there is no VMP board installed, process flow proceeds to block 686 wherein the host computer would present the user a menu which would not contain the speech file download option. Process flow would then proceed in block 687 to accomplish any other INET command that the user selected including exiting beyond that program. If at decision block 685, the host computer determines that a VMP board was installed in the particular telephone, process flow proceeds to block 688 where INET would present the user with a menu of possible INET functions which would include the speech file download option.

Process flow then proceeds to decision block 689 where the host computer determines if the user selects the speech file download option. If the user did not select the speech file download option, process flow proceeds to block 694 and accomplishes any other INET commands selected by the user including exiting the INET program. If the user selected the speech file download option at decision block 689, process flow would proceed to block 690, which would prompt the user to enter the speech file name. Process flow then proceeds to block 691 where the host computer 76 would open the named speech file.

Process flow proceeds to block 692 where a block of data from the opened speech file is transmitted to the telephone in the field. The information transmitted to the telephone in the field is received by modem 30 and microprocessor control system 10 would store the block of data in the appropriate place in speech memory 46 shown in FIG. 3. Process flow then proceeds to decision block 693 where the host computer 76 determines if there is any more data blocks to be transmitted. If there are more data blocks to be transmitted, process flow loops back to block 692 and those blocks are transmitted. If there are no more blocks to be transmitted, process flow returns to block 688 which once again presents the user with a menu including the speech file download option.

Credit Card Verification

FIG. 11 illustrates in flow chart form the various methods in which a telephone constructed in accordance with the teaching of the present invention verifies a telephone billing account number for use in making long distance telephone calls. FIG. 11 shows in greater detail blocks 528 on FIG. 8*b* and 596 on FIG. 8*e*.

Program flow begins at block 700 and proceeds to decision block 702 where microprocessor control system 10 consults rate table memory 16 to determine if the validation interface computer system (VICS) has been enabled. If the VICS verify system is enabled, program flow proceeds to block 704 where microprocessor control system 10 uses telephone line interface 38 and DTMF generator 36 to dial the VICS number. The VICS then answers the telephone inquiry and standard communications occur between the telephone and the VICS as were described in FIG. 4 previously. The VICS then interacts using a high speed data link with a validation data base service to determine if the billing number is valid or invalid. The microprocessor control system 10 receives the information as to whether the billing number is valid or invalid, and stores that information in stack RAM. Program flow then proceeds to decision block 706 where the microprocessor control system 10 tests the information stored in stack RAM and sets a flag depending on whether the billing number was valid or invalid, as shown by blocks 708 and 710 respectfully in FIG. 11.

If at decision block 702 the microprocessor control system 10 determined that the VICS verify system was not enabled, program flow would proceed to decision block 712, where microprocessor control system 10 would consult rate memory table 16 to see if the call method of verification was enabled. If the call method of verification is not enabled, program flow proceeds to block 714 and the billing number is assumed valid. If at decision block 712 the call method verification process was enabled, program flow proceeds to decision point 713. At decision point 713 a decision is made whether the call was an 0+ credit card call or not. If the call is not an 0+ credit card call program flow proceeds to block 714. If the call is a 0+ credit card call, program flow proceeds to block 716. At block 716, the telephone dials a preprogrammed verification number which is set up to always be busy or to never answer. This programmed number is stored in rate memory 16. The programmed number can be up to 15 digits long which allows the telephone to insert the prefix 10288 in front of the number so that the AT&T system may be used even if the carrier prescribed to the telephone is not AT&T. In one embodiment of the present invention, the telephone is programmed to call itself, a number which is guaranteed to be busy.

Program flow then proceeds to decision block 718 where microprocessor control system 10 uses DTMF receiver 52 to detect a bong tone through telephone line interface 38. If no bong tone is detected, program flow proceeds to decision block 720 where microprocessor control system 10 checks to see if a predetermined amount of time has elapsed waiting for the bong tone. If the predetermined amount of time has elapsed, program flow proceeds to block 722 which routes the call to a live operator. In this case, the telephone assumes that something is wrong with the validation procedure.

At decision block 718, when a bong tone is detected, program flow proceeds to block 724 where microprocessor control system 10 dials the billing number stored in its stack ram using DTMF generator 36. Program flow then proceeds to decision 726 where microprocessor control system 10 uses call status detector 50 and call status detector 28 to sense either busy tone or a ring back tone on the telephone line. If either of these tones is detected, a successful call has been placed using the billing number, and therefore, the billing number is valid.

Program flow then proceeds to block 728 which would set a RAM flag contained within microprocessor control system 10 that indicates to the rest of the system that the billing number is valid. If no busy tone or ring back tone is detected, program flow proceeds to decision block 730 wherein microprocessor control system 10 determines if a programmed amount of time has elapsed waiting for the busy tone or ring back tone. Once the predetermined amount of time has elapsed, the telephone assumes that successful calls cannot be placed with this billing number, and RAM flags are set within microprocessor control system 10 to inform the rest of the system that the billing number is not valid at block 732. If the predetermined amount of time has not elapsed, program flow loops back to decision block 726 where once again microprocessor control system 10 tests for busy tone or ring back tones.

Voice Messaging System

Figure 12A:
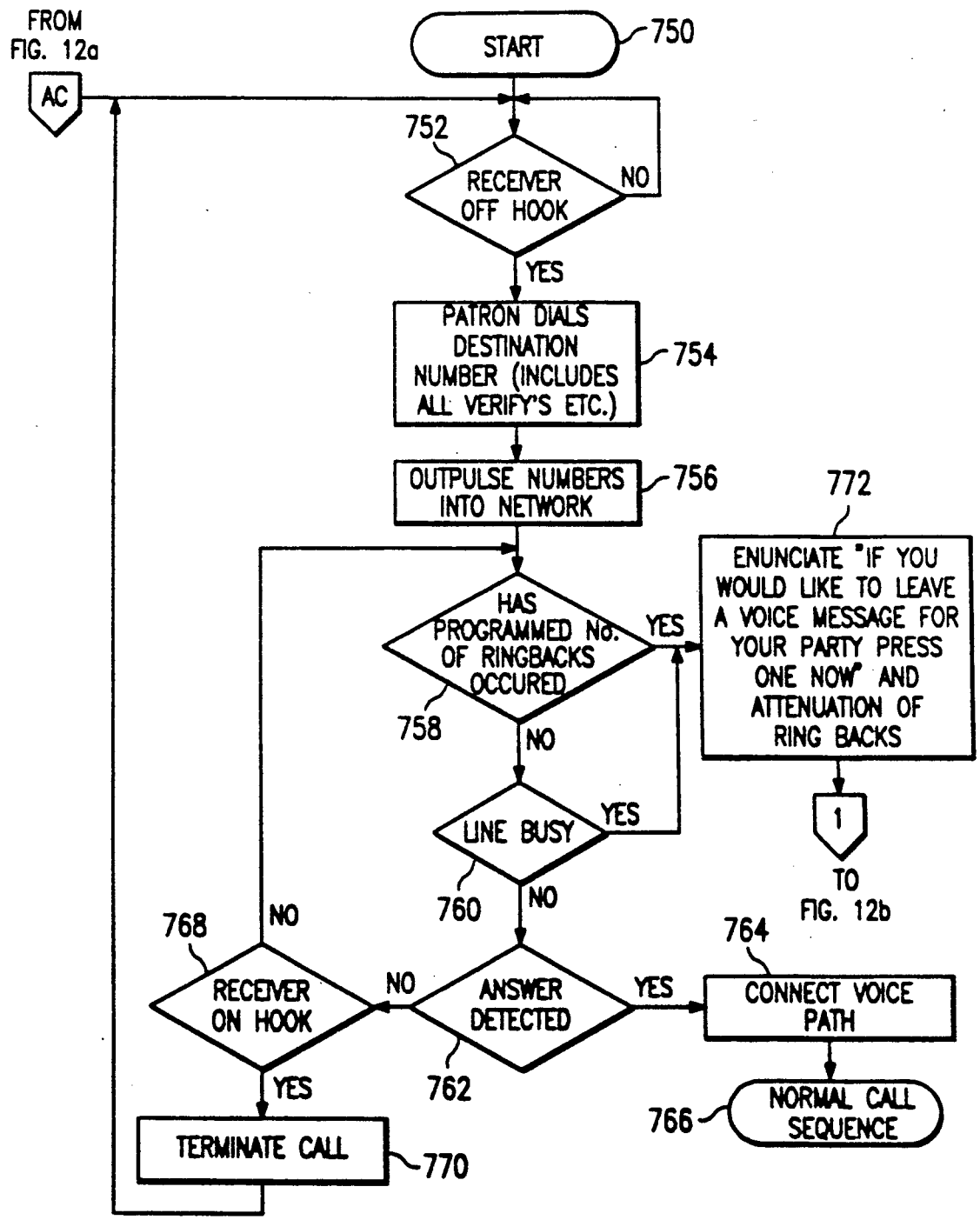
FIGS. 12a-12b are flow charts demonstrating the process for voice mail used in the present invention.
Figure 12B:
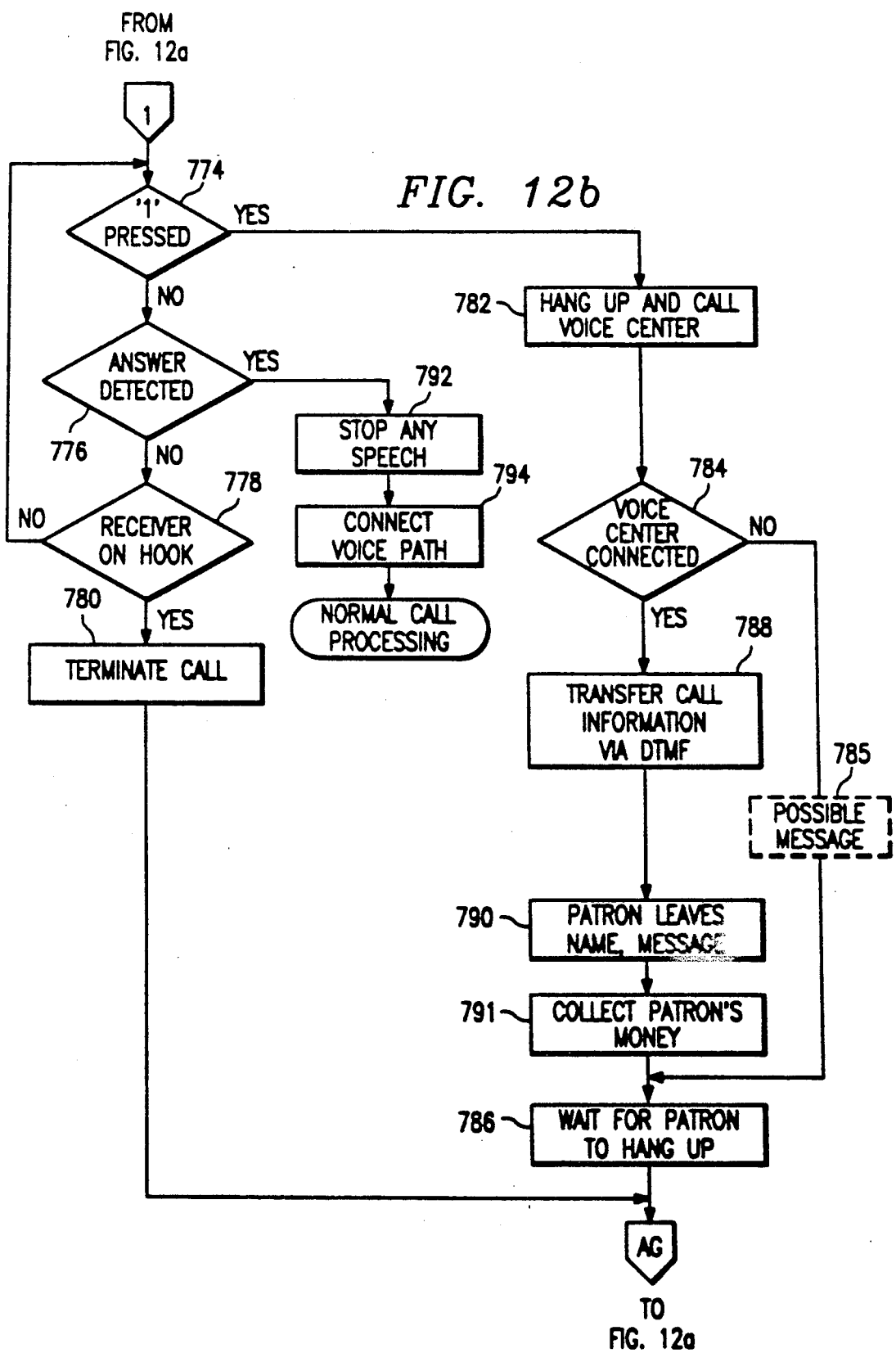

FIGS. 12*a–b* represents in flow chart form the capability of a telephone constructed according to the teaching of the present invention to interact with a voice messaging system which would enable a patron to leave a message for the called party if he was unable to complete his call. Program flow is initiated at block 750 and proceeds to decision block 752 which begins a loop wherein microprocessor control system 10 tests hooks switch 24 to determine if the receiver is off the hook. If the receiver is not off hook, program flow loops back and continues to test until the receiver goes off hook, at which point program flow proceeds to block 754 wherein the patron dials his destination number through keypad 24. Block 754 also includes any necessary verification steps and any processing that might have been needed to be done in order to place the call. These steps have been described in earlier FIGURES.

Program flow then proceeds to block 756 where microprocessor control system 10 outpulses the appropriate numbers into the network in order to place the call. Program flow then proceeds to decision block 758 where microprocessor control system 10 tests to see if a preprogrammed number of ring backs has occurred. This preprogrammed number is stored in rate memory 16 and as the ring backs occur, the counter which is contained in microprocessor control system 10 counts the number of rings and compares it to the predetermined number. This preprogrammed number can be set by the user, and determines when the voice messaging system initiates.

If the preprogrammed number of ring backs has not yet occurred, program flow proceeds to decision 760 wherein microprocessor control system 10 uses call status detector 50 and call status detector 28 to determine if the line is busy. If the line is not busy, program flow proceeds to decision block 762 where microprocessor controls system 10 once again uses call status detector 28 and call status detector 50 to detect if the telephone has been answered. If the telephone is answered, program flow proceeds to block 764 where microprocessor control system 10 connects a voice path and program flow proceeds to 766 which is the normal call sequence depending on what type of call the patron originally placed. This could include, for example, an EZ collect call, a direct dial call 0+ or a coin call.

If at decision block 762 no answer was detected, then program flow proceeds to decision block 768 where microprocessor control system 10 tests hookswitch 24 to determine if the patron has hang up the telephone. If the patron has hang up the telephone, program flow proceeds to block 770 where microprocessor control system 10 terminates the call. The program flow then loops back to decision block 752 to wait for the next call. If at decision block 768 the patron has not hang up the telephone, program flow loops back to decision block 758 to wait for the programmed number of ring backs, the detection of a busy signal, or the detection of an answer.

If at decision 758 the preprogrammed number of ring backs has occurred or at decision 760 a busy signal was detected, program flow proceeds to block 772 where microprocessor control system 10 which uses the speech record/playback generator 44 to enunciate a message through switch array 54 into earpiece 26, which tells the patron to press 1 if he would like to leave a voice message. Also, in block 772, the ring back or body signal the patron was hearing from the phone line, is attenuated approximately 20 dB by attenuator 62. This is done so that the patron can hear the telephone's instructions more clearly while still listening to the phone line. Program flow then proceeds to branch point 1 which continues on FIG. 12b.

Referring to FIG. 12b, program flow proceeds from branch point 1 to decision block 774 where microprocessor control system 10 checks keypad 24 to see if the patron has pressed the one digit indicating that he would like to leave a voice message. If the patron has not pressed the one digit, program flow proceeds to decision block 776 where microprocessor control system 10 again checks call status detector 50 and call status detector 28 to determine if the called party has answered. If the called party has not answered, program flow proceeds to decision block 778 wherein microprocessor control system 10 checks hookswitch 24 to determine if the patron has hung up. If the patron has hung up, program flow proceeds to block 780 where microprocessor control system 10 terminates the call. Program flow then proceeds to branch point AG which reenters the program flow at decision block 752 on FIG. 12a. If at decision block 778, the patron had not hung up the telephone, program flow loops back to decision block 774. If at block 774 the one digit has been pressed, program flow proceeds to block 782 where microprocessor control system 10 terminates the telephone call and places a call to the voice mail center. The number of the voice mail center is stored in rate memory 16.

Program flow then proceeds to decision block 784 where microprocessor control system 10 waits a predetermined amount of time for the voice mail center to come on line. If the voice mail center does not answer, program flow proceeds to block 786 where microprocessor control system 10 waits for the patron to hang up. Program flow then proceeds to branch point AG which reenters the program flow at decision block 752 on FIG. 12a. An alternate embodiment could include an additional speech message, indicated at block 785, informing the patron that the voice mail center has not answered.

If at decision block 784 the voice mail center answers, program flow proceeds to block 788 where microprocessor control system 10 utilizes DTMF generator 36 to transfer information to the voice mail center about the call. This information is required to enable the voice mail center to know where the caller is trying to place the voice mail message as well as identification information about the particular telephone calling in for billing record purposes. Program flow would then proceed to block 790 where the patron would leave his name and message at the voice mail center. This would all be controlled by the voice mail center and the individual telephone would only have to enable the earpiece 26 and the mouthpiece 32 so that the patron could interact with the voice mail center. Program flow then proceeds to block 791 where microprocessor control system 10 uses coin return collect 22 to collect the patron's money. Program flow then proceeds to block 786 and branch point AG which waits for the patron to hang up the telephone and loops back to wait for the next call.

The voice mail center would then take the message the patron had recorded and ring the number the patron was trying to call, for example, every fifteen minutes for two to three hours to attempt to deliver the patron's message. The actual voice mail center could be located in a remote location or it could be located within a localized telecommunications system, depending solely on cost effectiveness.

If at decision block 776, the called party has answered, program flow proceeds to block 792 where microprocessor control system 10 stops any speech message that may be playing. Program flow then proceeds to block 794 where microprocessor control system 10 connects a voice path and program flow then proceeds to normal call processing depending on the particular type of telephone call that was placed.

In summary, the present invention provides for a telecommunications station which can perform locally a variety of functions which required prior systems to use a central office or centralized AOS. A pay telephone station constructed according to the teachings of the present invention can locally verify telephone billing account numbers and place a call using the verified number. The verified number is then stored for a predetermined period of time. A telephone constructed according to this aspect of the present invention accordingly enjoys the technical advantage of the capability of accessing the stored validated numbers to substantially reduce call processing time. In this manner, a patron placing calls at the same telephone using the same billing account number need not wait for the number to be revalidated. In addition, the system can locally generate a billing record of the call which can later be retrieved to facilitate the billing of the patron.

A telephone constructed according to the teachings of the present invention enjoys the technical advantage of comprising a microprocessor control system. This system enables the local station to use locally stored speech messages to interact with the patron during the patron's use of the station.

The foregoing description uses preferred embodiments and processes to illustrate the present invention. However, changes and modifications may be made in these embodiments without departing from the scope of the present invention. For example, the particular order of event or messages relayed to a patron described herein could be modified depending upon a variety of circumstances. The content of the messages could also be altered depending on local circumstances. These and other modifications are intended to be included within the scope of the present invention.

While the present invention is illustrated by the embodiments in the above detailed description, it is not limited to these embodiments but rather only by the scope and spirit of the claims which follow.

What is claimed is:

1. A device remote from a central office for processing a plurality of telephone calls for a user utilizing a billing account number, comprising:
   a hookswitch operable to initiate and terminate calls from the device;
   circuitry at the device for receiving the billing account number after the user has initiated a first call using said hookswitch;
   circuitry at the device for assessing the validity of the billing account number prior to the user placing the first call of the plurality of calls;
   circuitry at the device for storing the billing account number if the billing account number is valid such that the user may place the plurality of calls using the billing account number within the predetermined period of time without having to have the billing account number revalidated, said stored billing account number continuing to be stored after the user terminates the first call using said hookswitch;
   circuitry at the device for polling said circuitry for storing to determine if a billing account number is valid;
   circuitry at the device for determining a chargeable amount of time associated with each of the plurality of calls; and
   circuitry at the device for creating a billing file associated with each of the plurality of calls.

2. The device of claim 1 wherein said billing file comprises the billing account number and said chargeable amount of time.

3. The device of claim 1 and further comprising:
   a rate table circuit at the device; and
   a calculation circuit for applying a selected rate from said rate table circuit to a chargeable amount of time for each of said plurality of calls to calculate a chargeable amount for each of the plurality of calls.

4. The device of claim 3 wherein said billing file comprises said chargeable amount calculated each of the plurality of calls.

* * * * *

UNITED STATES PATENT AND TRADEMARK OFFICE
CERTIFICATE OF CORRECTION

PATENT NO. : 5,131,027           Page 1 of 2

DATED : July 14, 1992

INVENTOR(S) : John A. Hird, et al.

It is certified that error appears in the above-identified patent and that said Letters Patent is hereby corrected as shown below:

ON THE TITLE PAGE:

After "References Cited - U.S. PATENT DOCUMENTS", please insert the following:

| | | | |
|---|---|---|---|
| 3,813,495 | 5/1974 | Conerly | 179/7MM |
| 3,829,617 | 8/1974 | Caithamer et al. | 179/7.1R |
| 4,054,756 | 10/1977 | Camella et al. | 179/18B |
| 4,122,308 | 10/1978 | Weinberger et al. | 179/7.1R |
| 4,326,123 | 4/1982 | Hosterman | 235/380 |
| 4,538,030 | 8/1985 | Fossett et al. | 179/7.1TP |
| 4,585,904 | 4/1986 | Mincone et al. | 179/7.1TP |
| 4,593,157 | 6/1986 | Usdan | 179/90BD |
| 4,595,983 | 6/1986 | Gehalo et al. | 364/401 |
| 4,712,230 | 12/1987 | Rice et al. | 379/112 |
| 4,731,818 | 3/1988 | Clark et al. | 379/144 |
| 4,736,405 | 4/1988 | Akiyama | 379/89 |
| 4,746,786 | 5/1988 | Heberle et al. | 235/380 |
| 4,763,350 | 9/1988 | Immendorfer et al. | 379/67 |
| 4,766,604 | 8/1988 | Axberg | 379/67 |
| 4,768,223 | 8/1988 | Kinoshita et al. | 379/143 |
| 4,769,834 | 9/1988 | Billinger et al. | 379/112 |
| 4,777,647 | 10/1988 | Smith et al. | 379/151 |
| 4,791,640 | 12/1988 | Sand | 370/58 |
| 4,797,910 | 1/1989 | Daudelin | 379/67 |
| 4,825,460 | 4/1989 | Carter et al. | 379/67 |
| 4,935,956 | 6/1990 | Hellwarth et al. | 379/112 |

UNITED STATES PATENT AND TRADEMARK OFFICE
CERTIFICATE OF CORRECTION

PATENT NO.   :   5,131,027
DATED        :   July 14, 1992
INVENTOR(S)  :   John A. Hird, et al.

It is certified that error appears in the above-identified patent and that said Letters Patent is hereby corrected as shown below:

OTHER PUBLICATIONS

Exhibits A-N, various materials compiled by Applicants.

Operator Services Systems Generic Requirements (OSSGR), vol. 3, "Feature Specific Documents", Technical Reference TSY-000271, Calling Card Service, Bell Communications Research, Rev. 3, Mar. '88.

Operator Services Systems Generic Requirements (OSSGR), vol. 3, "Feature Specific Documents", Technical Reference TSY-000271, Collect Billing, Bell Communications Research, Rev. 3, Mar. '88.

Signed and Sealed this

Fourth Day of January, 1994

*Attest:*

BRUCE LEHMAN

*Attesting Officer*   Commissioner of Patents and Trademarks